United States Patent
Thomas et al.

(10) Patent No.: US 7,945,600 B1
(45) Date of Patent: May 17, 2011

(54) TECHNIQUES FOR ORGANIZING DATA TO SUPPORT EFFICIENT REVIEW AND ANALYSIS

(75) Inventors: Joy Aloysius Thomas, Sunnyvale, CA (US); Mohana Krishna Lakhamraju, Los Altos, CA (US); George Manianghat Mathew, Sunnyvale, CA (US); Pangal Pandurang Nayak, Palo Alto, CA (US); Gollakota Venkata Ramana, Sunnyvale, CA (US); John O. Lamping, Los Altos, CA (US)

(73) Assignee: Stratify, Inc., Mountain View, CA (US)

( * ) Notice: Subject to any disclaimer, the term of this patent is extended or adjusted under 35 U.S.C. 154(b) by 995 days.

(21) Appl. No.: 11/073,338

(22) Filed: Mar. 4, 2005

Related U.S. Application Data

(63) Continuation-in-part of application No. 09/860,646, filed on May 18, 2001, now Pat. No. 7,469,246, and a continuation-in-part of application No. 10/017,504, filed on Dec. 14, 2001, now Pat. No. 7,308,451.

(60) Provisional application No. 60/551,487, filed on Mar. 8, 2004, provisional application No. 60/316,538, filed on Sep. 4, 2001.

(51) Int. Cl.
*G06F 7/00* (2006.01)
*G06F 17/30* (2006.01)
(52) U.S. Cl. ...................................... 707/804
(58) Field of Classification Search .................. 707/804, 707/999.102
See application file for complete search history.

(56) References Cited

U.S. PATENT DOCUMENTS

| | | | |
|---|---|---|---|
| 5,703,964 A | 12/1997 | Menon et al. | |
| 5,787,394 A | 7/1998 | Bahl et al. | |
| 5,787,422 A | 7/1998 | Tukey et al. | |
| 5,832,182 A | 11/1998 | Zhang et al. | |
| 5,864,855 A | 1/1999 | Ruocco et al. | |
| 5,895,470 A | 4/1999 | Pirolli et al. | |
| 5,899,995 A * | 5/1999 | Millier et al. | 1/1 |
| 5,999,927 A | 12/1999 | Tukey et al. | |
| 6,003,029 A | 12/1999 | Agrawal et al. | |
| 6,055,540 A | 4/2000 | Snow et al. | |
| 6,151,697 A | 11/2000 | Moeller | |
| 6,154,213 A | 11/2000 | Rennison et al. | |
| 6,182,066 B1 | 1/2001 | Marques | |
| 6,216,134 B1 | 4/2001 | Heckerman et al. | |
| 6,263,337 B1 | 7/2001 | Fayyad et al. | |
| 6,332,138 B1 * | 12/2001 | Hull et al. | 707/5 |
| 6,360,224 B1 | 3/2002 | Chickering | |
| 6,397,221 B1 | 5/2002 | Greef et al. | |
| 6,446,061 B1 | 9/2002 | Doerre et al. | |
| 6,513,027 B1 | 1/2003 | Powers et al. | |
| 6,523,026 B1 | 2/2003 | Gillis | |

(Continued)

OTHER PUBLICATIONS

Non-Final Office Action for U.S. Appl. No. 09/860,646; mailed on Aug. 30, 2004; pp. 18.

(Continued)

*Primary Examiner* — John Breene
*Assistant Examiner* — Aleksandr Kerzhner
(74) *Attorney, Agent, or Firm* — Kilpatrick Townsend & Stockton LLP

(57) ABSTRACT

Techniques for organizing a corpus of electronic documents. The electronic documents are organized in a manner that facilitates review of the documents. The documents are organized into a concept-based hierarchical collection of folders based upon contents of the documents.

32 Claims, 9 Drawing Sheets

U.S. PATENT DOCUMENTS

| | | | |
|---|---|---|---|
| 6,581,058 B1 | 6/2003 | Fayyad et al. | |
| 6,629,097 B1 | 9/2003 | Keith | |
| 6,633,882 B1 | 10/2003 | Fayyad et al. | |
| 6,671,818 B1 | 12/2003 | Mikurak | |
| 6,678,671 B1 | 1/2004 | Petrovic et al. | |
| 6,687,705 B2 | 2/2004 | Agrawal et al. | |
| 6,725,228 B1* | 4/2004 | Clark et al. | 1/1 |
| 6,766,355 B2 | 7/2004 | Liang et al. | |
| 6,778,995 B1 | 8/2004 | Gallivan et al. | |
| 6,792,545 B2 | 9/2004 | McCreight et al. | |
| 6,820,081 B1 | 11/2004 | Kawai et al. | |
| 6,829,713 B2 | 12/2004 | Cooper et al. | |
| 6,839,680 B1 | 1/2005 | Liu et al. | |
| 6,888,548 B1 | 5/2005 | Gallivan | |
| 6,892,193 B2 | 5/2005 | Bolle et al. | |
| 6,978,274 B1 | 12/2005 | Gallivan et al. | |
| 6,993,535 B2 | 1/2006 | Bolle et al. | |
| 7,035,876 B2 | 4/2006 | Kawai et al. | |
| 7,107,266 B1 | 9/2006 | Breyman et al. | |
| 7,143,091 B2* | 11/2006 | Charnock et al. | 707/5 |
| 7,191,175 B2 | 3/2007 | Evans | |
| 7,271,804 B2 | 9/2007 | Evans | |
| 7,308,451 B1 | 12/2007 | Lamping et al. | |
| 7,469,246 B1 | 12/2008 | Lamping | |
| 2001/0039544 A1 | 11/2001 | Chakrabarti et al. | |
| 2002/0080180 A1* | 6/2002 | Mander et al. | 345/769 |
| 2002/0167538 A1* | 11/2002 | Bhetanabhotla | 345/700 |
| 2005/0086253 A1* | 4/2005 | Brueckner | 707/102 |

OTHER PUBLICATIONS

Final Office Action for U.S. Appl. No. 09/860,646; mailed on Jun. 7, 2005; pp. 22.
Non-Final Office Action for U.S. Appl. No. 09/860,646; mailed on Feb. 23, 2006; pp. 28.
Non-Final Office Action for U.S. Appl. No. 09/860,646; mailed on Jun. 19, 2007; pp. 14.
Notice of Allowance for U.S. Appl. No. 09/860,646; mailed on Feb. 27, 2008; pp. 5.
Non-Final Office Action for U.S. Appl. No. 10/017,504; mailed on Dec. 18, 2003; pp. 12.
U.S. Appl. No. 11/931,004, filed Oct. 31, 2007, Gaffin.
Final Office Action for U.S. Appl. No. 10/017,504; mailed on May 26, 2004; p. 12.
Advisory Action for U.S. Appl. No. 10/017,504; mailed on Nov. 2, 2004; p. 3.
Non-Final Office Action for U.S. Appl. No. 10/017,504; mailed on May 5, 2005; p. 11.
Final Office Action for U.S. Appl. No. 10/017,504; mailed on Jan. 11, 2006; p. 13.
Non-Final Office Action for U.S. Appl. No. 10/017,504; mailed on Nov. 2, 2006; p. 14.
Final Office Action for U.S. Appl. No. 10/017,504; mailed on May 7, 2007; p. 12.
Notice of Allowance for U.S. Appl. No. 10/017,504; mailed on Aug. 3, 2007; p. 3.
Non-Final Office Action for U.S. Appl. No. 11/931,004 mailed on Mar. 4, 2010; 25 pages.
Final Office Action for U.S. Appl. No. 11/931,004 mailed on Aug. 2, 2010; 10 pages.
Supplemental Notice of Allowance for U.S. Appl. No. 11/931,004 mailed on Nov. 15, 2010; 3 pages.
Notice of Allowance for U.S. Appl. No. 11/931,004 mailed on Oct. 28, 2010; 8 pages.
Fraley et al., "How Many Clusters? Which Clustering Method? Answers Via Model-Based Cluster Analysis", The Computer Journal, vol. 41, No. 8, (1998) pp. 578-588.
Fraley, "Algorithms for Model-Based Gaussian Hierarchical Clustering", SIAM J. Sci. Comput., vol. 20, No. 1, (1998) pp. 270-281.
Iwayama et al., "Hierarchical Bayesian Clustering for Automatic Text Classification", Proceedings of the Fourteenth Intl. Joint Conference on Artificial Intelligence, vol. 2, (Aug. 1995) pp. 1322-1327.
Jain and Dubes, *Algorithms for Clustering Data*, Prentice Hall, (1988) QA 278, J341, Chapter 3, pp. 55-142.
Willett, "Document Clustering Using an Inverted File Approach", Journal of Information Science 2 (1980) pp. 223-231.

* cited by examiner

TECHNIQUES FOR ORGANIZING DATA TO SUPPORT EFFICIENT REVIEW AND ANALYSIS

CROSS-REFERENCES TO RELATED APPLICATIONS

This application claims priority to and is a non-provisional of U.S. Provisional Patent Application No. 60/551,487, filed Mar. 8, 2004, the entire contents of which are incorporated herein by reference for all purposes.

The present application also claims priority from and is a continuation-in-part application of the following two applications, the entire contents of which are incorporated herein by reference for all purposes:

(1) U.S. application Ser. No. 09/860,646 filed May 18, 2001 entitled "Method and System for Classifying or Clustering One Item Into Multiple Categories"; and (2) U.S. application Ser. No. 10/017,504 filed Dec. 14, 2001 entitled "Method and System for Guided Cluster Based Processing on Prototypes" which in turn claims priority to U.S. Provisional Patent Application No. 60/316,538 filed Sep. 4, 2001.

BACKGROUND OF THE INVENTION

The present invention is related to techniques for organizing data, and more particularly to techniques for organizing a collection of documents into hierarchical groups of documents to facilitate review of the documents.

The widespread use of computers has led to an explosion in the amount of electronic textual data being created. Such electronic textual data comes in a variety of different forms: emails, office documents (including, but not limited to, word processing documents, presentations, spreadsheets, etc.), instant messaging logs, call center agent notes, newsgroup messages, Web pages, on-line newspapers, among others. The existence of such large corpora of textual data has accentuated the need for automated techniques for the rapid analysis, organization, review, and mining of these corpora.

Due to the large number of electronic documents that may be available, the review and analysis of these documents is a very daunting task. This is especially evident in the legal area. For example, traditional ways of conducting legal discovery have been overwhelmed by the sheer volume of discoverable information that is available in electronic form. Law firms and their clients are under increasing pressure to efficiently review documents to identify documents to be produced for large litigation cases as well as to analyze complex document sets that have been produced to identify and extract critical fact patterns pertinent to the litigation.

As an example, in a typical litigation, one party may serve a discovery request on some other party requesting the other party to produce any and all documents related to a particular subject matter. The party receiving the discovery request has the daunting challenge of reviewing a potentially large set of electronic documents (including emails, attachments, typical office documents, CAD drawings, patent filings, instant messaging logs, etc.) and paper documents (such as faxes, notebooks, and printed reports) to identify all relevant documents that need to be produced, while being sensitive to issues such as privilege and confidentiality. Once the discovery request has been fulfilled, the requesting party then has the equally daunting challenge of analyzing the resulting document corpus to help prepare for the litigation itself. The analysis task is further complicated by the fact that the result of discovery may, and often does, include large amounts of irrelevant documents (for example, junk email, non-confidential documents that are not about the subject matter of interest, and so forth).

Traditionally, the process of legal discovery and analysis has been a laborious manual process carried out with printed hard-copy versions of documents. Even with the availability of data in electronic form, electronic documents are manually organized by subject matter. Such a manual process may work for a relatively small collection of documents but is not feasible for a large collection of documents as it takes too long and is too expensive. Further, with manual organization, the consistency of the organization cannot be ensured. Accordingly, as the size of the document collection grows, automated techniques for organizing documents are desired.

In an effort to automatically organize documents, law firms have increasingly used search engines to automatically identify groups of related documents. The idea is to characterize the subject matter of interest with a search query. All documents that match the search query are then assumed to be about the same subject matter of interest. However, there are several problems with this approach. Most users find it difficult to craft an appropriate query—a query may be too specific or too general. If it is too specific, relevant documents may be missed by the search. On the other hand, if it is too general, several irrelevant documents may be identified by the search. As a result, a user is often left with the uncomfortable feeling that relevant documents are being missed by the search, while being forced to wade through irrelevant documents that happened to match the query. Additionally, it is often not known what query needs to be constructed since the range of subjects in a document collection may not be known a priori. Further, due to the nature of the English language, searches may return ambiguous results.

More recently, "fuzzy" searches have been proposed as an alternative to traditional search engines. Fuzzy searches perform searches using terms specified in a search query and also based upon other terms that are determined (using statistical analysis) to co-occur with the search query terms. While "fuzzification" of search queries addresses some of the limitations of traditional searches, it also has significant shortcomings. "Fuzzy" searches may not be appropriate in all situations, such as where exact matching of search terms is desired. "Fuzzy" searches also do not effectively deal with the issue that words often have different meanings or senses, and hence co-occur with different words in different documents. "Fuzzy" searches do not provide a mechanism that allows users to identify these different senses or to select the appropriate sense. Further, as with traditional searches, the subject matter to be searched for may not be known a priori.

The problem of reviewing and analyzing a large corpus of documents is thus found in a number of other areas (e.g., legal area) where there is a need to analyze a large amount of data. In addition to the legal area, examples of other areas include: intelligence analysts need to rapidly review and analyze news reports and agent reports from all around the world to rapidly identify threats; customer service managers need to analyze call center agent notes to rapidly identify emerging problems and trends; companies need to analyze news reports, analyst reports, and newsgroup messages to gauge the strength of, and threats to, their brand or the effectiveness of a marketing campaign; etc.

BRIEF SUMMARY OF THE INVENTION

Embodiments of the present invention provides techniques for organizing a corpus of electronic documents. The electronic documents are organized in a manner that facilitates review of the documents. The documents are organized into a concept-based hierarchical collection of folders based upon contents of the documents.

According to an embodiment of the present invention, techniques are provided for organizing a plurality of electronic documents to facilitate review of the electronic documents. A summary representation is generated for each electronic document in a plurality of electronic documents. Similarity metrics are determined between electronic documents in the plurality of electronic documents based upon the summary representations for the electronic documents. The plurality of electronic documents are grouped into a hierarchical collection of folders based upon the similarity metrics, each folder in the hierarchical collection of folders comprising one or more electronic documents from the plurality of electronic documents related to a concept represented by the folder.

According to an embodiment of the present invention, a graphical user interface (GUI) is displayed to facilitate review of electronic documents in the plurality of electronic documents. In one embodiment, the GUI comprises: a first region displaying the hierarchical collection of folders; a second region displaying a list of electronic documents grouped in a selected folder from the hierarchical collection of folders; and a third region displaying a first electronic document selected from the list of electronic documents.

According to an embodiment of the present invention, at least one set of near duplicate documents is identified from the plurality of electronic documents, where the similarity metric between any two electronic documents in the set of near duplicate documents satisfies a threshold. For any one electronic document from the at least one set of near duplicate documents, the GUI provides a control for displaying information identifying the other electronic documents in the at least one set of near duplicate documents.

According to an embodiment of the present invention, techniques are provided for: enabling, using the GUI, association of one or more electronic documents from the plurality of documents with one or more tags from a plurality of tags; enabling, using the GUI, assignment of one or more electronic document from the plurality of electronic documents to one or more users from a plurality of users; and enabling, using the GUI, an action to be performed on multiple electronic documents from the plurality of electronic documents.

According to an embodiment of the present invention, techniques are provided for assigning a number to each electronic document in the plurality of electronic documents by traversing the hierarchical collection of folders and based upon a set of rules, such that when the plurality of electronic documents are sorted based upon the assigned numbers to generate a sorted list of electronic documents, related electronic documents occur consecutively in the sorted list of electronic documents. This enables reviewers of the documents to proceed sequentially through related documents.

According to an embodiment of the present invention, techniques are provided for organizing, for at least one folder in the hierarchical collection of folders, electronic documents grouped in the at least one folder into an organized list of electronic documents such that related electronic documents occur next to each other in the organized list. In one embodiment, a document number is assigned to each electronic document grouped in the at least one folder based upon a set of rules, such that when the electronic documents grouped in the at least one folder are sorted based upon the assigned numbers to generate the organized list of electronic documents, related electronic documents occur consecutively in the organized list of electronic documents.

The foregoing, together with other features, embodiments, and advantages of the present invention, will become more apparent when referring to the following specification, claims, and accompanying drawings.

BRIEF DESCRIPTION OF THE DRAWINGS

FIG. 7 depicts a simplified graphical user interface (GUI) according to an embodiment of the present invention;

FIG. 8 depicts another simplified graphical user interface (GUI) according to an embodiment of the present invention.

DETAILED DESCRIPTION OF THE INVENTION

In the following description, for the purposes of explanation, specific details are set forth in order to provide a thorough understanding of the invention. However, it will be apparent that the invention may be practiced without these specific details. For example, an embodiment of the present invention has been described below for organizing electronic documents related to legal data discovery. However, the scope of the present invention is not limited to the legal domain and may be applicable to any domain that involves review and analysis of a large collection of electronic documents.

Figure 1:
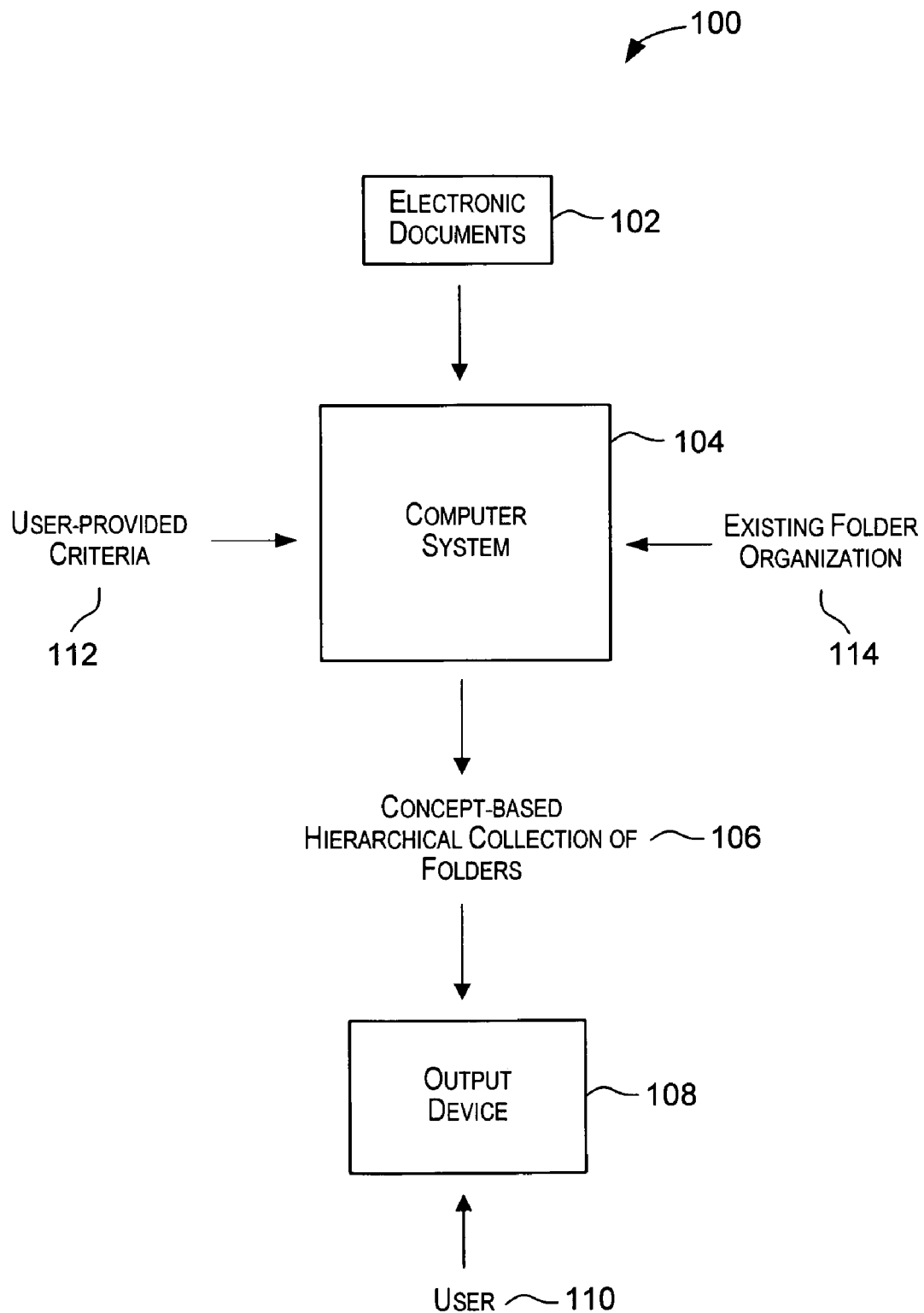
FIG. 1 is a simplified block diagram of a system that may incorporate an embodiment of the present invention.

FIG. 1 is a simplified block diagram of a system 100 that may incorporate an embodiment of the present invention. FIG. 1 is merely illustrative of an embodiment incorporating the present invention and does not limit the scope of the invention as recited in the claims. One of ordinary skill in the art would recognize other variations, modifications, and alternatives.

As depicted in FIG. 1, a collection of electronic documents 102 (or a corpus of electronic documents) may be available. Documents 102 may include for example documents that have been produced in response to a legal discovery request. Documents 102 may include documents of different types and formats including but not limited to emails, attachments, text documents, spreadsheets, PDF documents, tables, figures, MS WORD documents, Excel files, Powerpoint files, CAD drawings, message logs, patent filings, instant messages, archived files, compressed files, and the like. The documents may be stored on various memory devices including but not limited to floppies, optical disks (e.g., CDs, DVDs, etc.), hard drives, tapes, other computers either local or remote to computer system 104, servers local or remote to computer system 104, and the like. The documents may also be generated by devices such as scanners, cameras, and the like.

According to an embodiment of the present invention, computer system 104 is configured to receive documents 102 and organize them into a hierarchical collection of folders 106 (or hierarchical groups of documents) where each folder contains related documents discussing a common topic or concept. Accordingly, a concept-based hierarchical collection of folders 106 is automatically generated by computer system 104. A folder is intended to refer to a grouping of one or more documents. As part of the processing, computer system 104 is configured to determine one or more concepts to which a particular document relates and then organize the document into an appropriate folder based upon the determined concepts. The folders may also be referred to as concept folders since each folder may represent one or more concepts. As described below in further detail, various different techniques may be used by computer system 104 to organize the various documents into a hierarchical collection of folders. As part of the processing, compute system 104 may also be configured to identify duplicate documents, identify near duplicate documents, identify non-related (or "junk") documents, and the like.

Information related to the hierarchical collection of folders may then be output to a user 110 via output device 108. The information that is output to the user may include information identifying the folders and information identifying the hierarchical relationships between the folders. Information identifying the documents organized in a folder may also be output to the user. Various different user interfaces may be provided for outputting the information to the user. Examples of user interfaces that may be used to output the information to the user are provided below. The information is output to the user in a manner that facilitates review of the documents by the user.

The user interfaces may also enable user 110 to perform various actions on the folders or on the documents contained in the folders. These actions may include for example, tagging the documents (or folders), displaying contents of the documents, assigning the documents to reviewers, annotating documents, printing the documents, and the like. According to an embodiment of the present invention, the user interface also enables the user to identify documents that are duplicates of or near duplicates of a particular document or other related documents.

As indicated above, computer system 104 may user various techniques to generate the hierarchical collection of folders. For example, according to an embodiment of the present invention, clustering techniques are used to organize the electronic documents into a hierarchical collection of folders. One such clustering technique is described in U.S. application Ser. No. 09/860,646 filed May 18, 2001 entitled "Method and System for Classifying or Clustering One Item into Multiple Categories", the entire contents of which are incorporated herein by reference for all purposes.

Embodiments of the present invention may also enable a user to influence the generation of the hierarchical collection of folders. For example, a user may provide criteria 112 to influence the generation of hierarchical collection of folders 106. Criteria 112 may include for example, keywords that are to be used for clustering purposes in addition to the concepts determined from the electronic documents, results from searches run by the user that are to be used for clustering, and the like. A user may also specify thresholds associated with the hierarchical collection of folders. For example, a user may specify a threshold indicating the maximum number of folders to be used, a threshold indicating the maximum allowed levels in the hierarchy of folders, thresholds associated with the number of documents in a folder, the degree of similarity of documents in a folder, and the like. Criteria 112 is then used by computer system 104 in the generation of hierarchical collection of folders 106.

According to an embodiment of the present invention, an existing organization of folders 114 may be input to computer system 104 and used by the computer system to generate hierarchical collection of folders 106. In this embodiment, the generation the hierarchical collection of folders 106 is biased or guided by existing folder organization 114 such that documents from electronic documents 102 are placed in folders from existing organization 114 as appropriate and new folders are created to store documents that contain content related to new concepts that are not represented by folders in existing organization 114. Accordingly, hierarchical collection of folders 106 that is generated by the biased clustering comprises the existing folder organization 114 with possibly new folders being added to contain documents that could not be placed in folders from the existing organization. One such biased technique that uses an initial organization to guide the clustering process is described in U.S. application Ser. No. 10/017,504 filed Dec. 14, 2001 entitled "Method and System for Guided Cluster Based Processing on Prototypes", the entire contents of which are incorporated herein by reference for all purposes.

Figure 2:
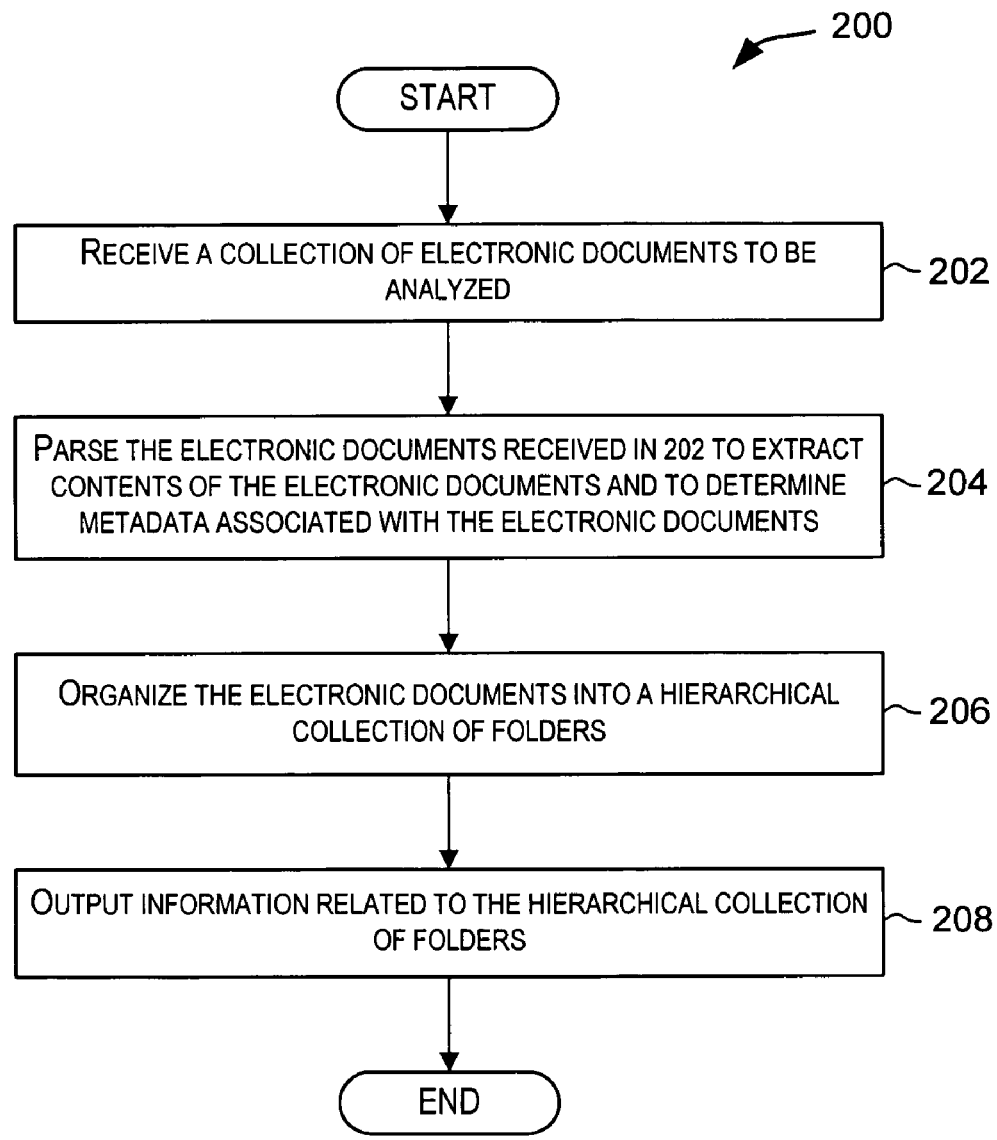
FIG. 2 is a simplified high-level flowchart depicting a method of organizing electronic documents according to an embodiment of the present invention.

FIG. 2 is a simplified high-level flowchart 200 depicting a method of organizing electronic documents according to an embodiment of the present invention. The method depicted in FIG. 2 may be performed by software code modules or instructions executed by a processor, hardware modules, or combinations thereof. Flowchart 200 depicted in FIG. 2 is merely illustrative of an embodiment of the present invention and is not intended to limit the scope of the present invention. Other variations, modifications, and alternatives are also within the scope of the present invention.

As depicted in FIG. 2 a collection of electronic documents that are to be analyzed (organized) is received (step 202). The electronic documents may be of various types and formats and may be received from or stored on various sources.

The electronic documents are then parsed to extract contents of the electronic documents and to determine metadata associated with the electronic documents in the collection of electronic documents received in 202 (step 204). Since the electronic documents may be stored on various media sources which may be local or remote to the computer system performing the processing, as part of 204, the electronic documents may be copied to a local area to facilitate processing. Further, as previously indicated, the electronic documents may be in different formats, including archived files such as email archives (such as PST files), compressed file archives (such as ZIP archives), and custom database archives (such as Concordance databases). Accordingly, as part of 204, the files within the archives may be individually extracted and copied to the local computer systems to facilitate further processing.

According to an embodiment of the present invention, based upon the parsed information, a summary representation may be prepared for each electronic document in 204 summarizing the contents of the electronic document. For example, in one embodiment, the summary representation is a vector in a high-dimensional space of words and phrases and is generated for each electronic document summarizing the word occurrences in the electronic document and their frequency. The summary representation may also include metadata about the document, such as information identifying the sender and receiver of an email. Other techniques known to those skilled in the art may also be used to generate a summary representation for a document. The summary representations may then be used to determine similarity metrics (or distance metrics) between documents.

According to an embodiment of the present invention, the summary representation is a set of pairs of words and scores. For example:
Document:25 information:12 Smythe:11 Stratify:11 PurpleYogi:9 Classifier:6 classification:6 hierarchy:5 word:5 proprietary:5 Discovery:4 systems:4 Confidential:4 concepts:4 Presentation:3 topic:3 set:3 items:3 MODEL:3 contents:3 article:2 Search:2 capital:2 Unstructured:2 knowledge:2 engine:2 clusters:2 Various other representations may also be used.

According to an embodiment of the present invention, each word in this high-dimensional space vector may be assigned an importance. A word's importance may be directly proportional to its frequency in the collection of electronic documents and inversely proportional to the fractions of the documents in which it occurs. For example, the word "router" is likely to occur quite frequently in a collection of documents from Cisco Systems™. In addition, it will likely occur in only a subset of the documents that talk about Cisco's router products, and hence it has a high discriminating power. All this implies a high importance. On the other hand, while a word like "Cisco" will occur frequently in the collection of electronic documents and it is likely to occur in every document. Therefore, its discriminating power is poor and hence it is not a very important word. As described below, the high-dimensional space vector determined in 204 may be used by clustering techniques for organizing the electronic documents into a hierarchical collection of folders.

As indicated above, metadata, if any, associated with the electronic documents may also be determined in 204. A variety of different metadata may be determined for an electronic document including, but not limited to, size of the electronic document, type of the electronic document (e.g., email, table, spreadsheet, etc.), time stamp associated with the electronic document (e.g., creation date, last modification date and time, etc.), storage location of the electronic document, title of the electronic document (e.g., document title, email subject), and so forth. The metadata that is extracted may be different for different types of electronic documents. For example, for emails, the metadata may include information identifying the sender of the email, the recipients of the email (including "CC" and "BCC" recipients, if applicable), the date when the email was sent, the subject line of the email, email attachment information, email thread information, and so forth.

In one embodiment, a hash representation (a type of summary representation) may be generated for each electronic document based upon the contents of the document and possibly based upon the metadata for the document. This hash representation may be used for identifying exact duplicates and near duplicates during subsequent processing.

In some embodiments, format conversion may also be performed as part of step 204 to facilitate extraction of the contents of the electronic documents and/or to facilitate or streamline further processing of the electronic documents. For example, one or more files from the collection of electronic documents may be converted to a common format such as HTML, plain text, XML, etc.

The electronic documents in the collection of electronic documents are then organized into a hierarchical collection of folders (step 206). The electronic documents may be organized such that related electronic documents discussing a common topic or concept are placed in one folder that represents documents related to that concept or topic. As part of step 206, the one or more concepts to which the contents of a document relate may be determined and the document assigned to one or more folders based upon the one or more concepts. New folders may be created for newly determined concepts. Various different techniques may be used to generate the hierarchical collection of folders. For example, according to an embodiment of the present invention, clustering techniques are used to organize the electronic documents into a hierarchical collection of folders. Further details related to processing performed in 206 are described below.

In one embodiment, all the documents received in 202 may be organized into a hierarchical collection of folders in 206. Alternatively, in some embodiments, the documents received in 202 may first be filtered using some filter criteria and only those documents that satisfy the filter criteria may be organized into the hierarchical collection of folders. Filtering reduces the number (or universe) of documents that have to be processed and thus increases the efficiency of the organization process.

Information related to the hierarchical collection of folders may then be output to a user (step 208). The information that is output may include information identifying the folders and information identifying the hierarchical relationships between the folders. Information identifying the documents organized in one or more folders may also be output to the user. The information is output to the user in a way that facilitates efficient review and analysis of the electronic documents by the user. Various different user interfaces may be provided for outputting the information to the user. The user interfaces may also enable a user to perform actions on the folders or on the documents contained in the folders. These actions may include for example, tagging the documents (or folders), displaying contents of the documents, assigning the documents to a reviewer, printing the documents, annotating documents, searching for keywords in the documents, and the like.

The information may be output to the user in various forms. For example, in one embodiment, the information may be formatted as a web page that may be accessed by the user (e.g., via a secured web site). The user may also customize the manner in which information is output to the user. Various different user interfaces may be used to output the information to the user.

Figure 3:
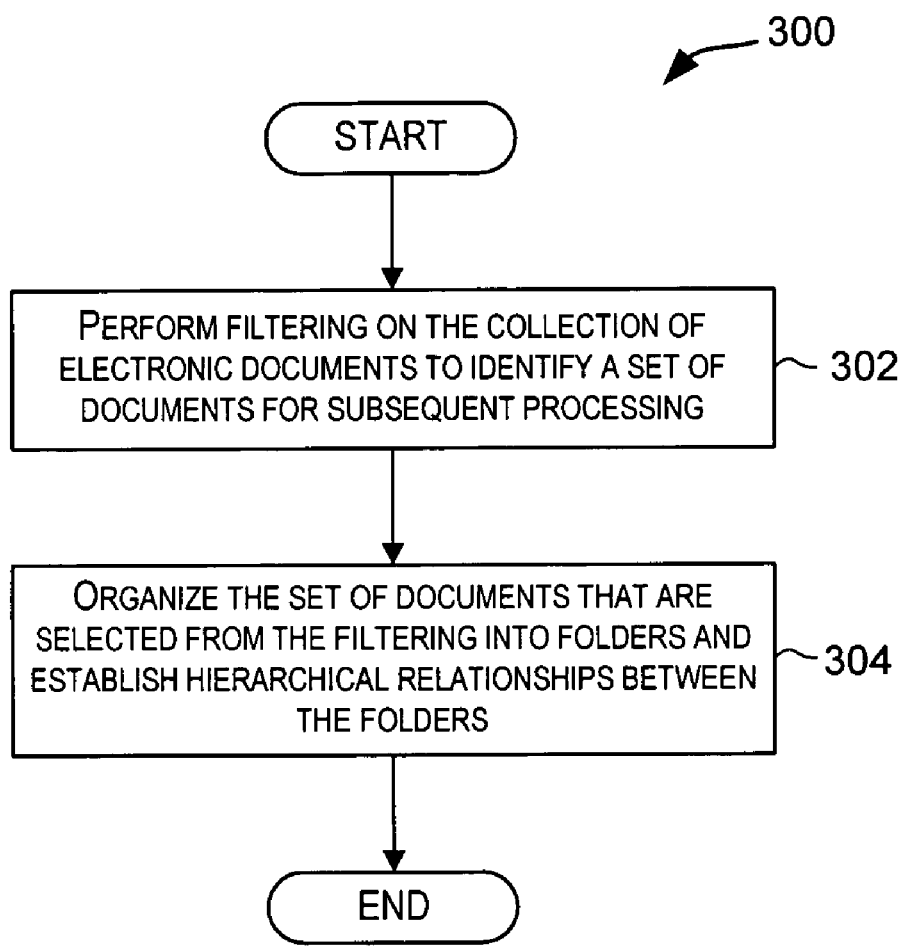
FIG. 3 is a simplified high-level flowchart depicting a method of organizing electronic documents into a hierarchical collection of folders according to an embodiment of the present invention.

FIG. 3 is a simplified high-level flowchart 300 depicting a method of organizing electronic documents into a hierarchical collection of folders according to an embodiment of the present invention. The method depicted in FIG. 3 may be performed by software code modules or instructions executed by a processor, hardware modules, or combinations thereof. Flowchart 300 depicted in FIG. 3 is merely illustrative of an embodiment of the present invention and is not intended to limit the scope of the present invention. Other variations, modifications, and alternatives are also within the scope of the present invention.

As depicted in FIG. 3, filtering is performed on the collection of electronic documents to reduce the number documents that have to undergo subsequent processing (step 302). In 302, only those documents that satisfy the filter conditions are selected for further processing. By reducing the number of documents that have to undergo subsequent processing, the total time for the processing is reduced. Additionally, filtering also helps to eliminate "junk" documents such as junk emails, mass mailings, and the like from subsequent processing. Filtering thus automatically reduces the universe of documents that are subjected to further processing. The documents that are filtered out may be presented to the user in a separate folder if the user wants to review the documents.

Various different filtering techniques may be used in 302. Keyword filtering may be used in one embodiment. In this technique, a filter may be defined comprising a set of one or more keywords or phrases. Only those electronic documents that contain at least one instance of a keyword or phrase in the filter are deemed to pass/satisfy the filter and are selected for subsequent processing. The set of keywords may be user-configurable. For example, a user may specify a filter that comprises keywords representing concepts or words that are relevant to the user. For example, for electronic documents provided in response to a discovery request, a lawyer may provide a set of keywords to be used for selecting documents, e.g., words identifying a particular litigant, a product, etc.

Various conditions may be specified for keyword matching. For example, a user may specify that the keyword matching is to be case sensitive or case insensitive. A user may also specify whether the matching for a keyword is to use stemming or not. Stemming is a process by which the root stem of a word is extracted, e.g., the words "runs", "running", and "runner" all have the same stem "run". Matching with stemming means that each word in the document is first stemmed and the matching is done with the stem of the input keyword. Weights may be associated with the filter keywords and the electronic document matching criterion may be set up to ensure that the sum of the weights of all matching keywords, weighted by the number of occurrences of the individual keywords, exceeds a specified user-configurable threshold.

Keywords may also be combined into rules with Boolean and other operators, so that only those electronic documents that match the rule are selected for subsequent processing. Boolean operators may include for example standard operators such as "AND", "OR", "NOT", and others. Other possible operators may include operators such as "WITHIN/n" (match must take place within n words), "SOUNDSLIKE" (matches words that sound like the input keywords), and so forth.

According to an embodiment of the present invention, the vector of words and phrases (or any other summary representation generated based upon the contents of an electronic document) generated in step 204 of FIG. 2 when the electronic documents are parsed may be used to determine whether or not a particular electronic document satisfies a keyword filter.

The electronic documents may also be filtered in 302 based upon metadata associated with the electronic documents. Rules may be specified in terms of document meta-data. Filtering may be performed on a variety of different metadata including, but not limited to, size of an electronic document, a hash representation of the contents of an electronic document (used for identifying exact duplicates), type of the electronic document (e.g., email, table, spreadsheet, etc.), time stamp associated with an electronic document (e.g., creation date, last modification date and time, etc.), storage location of an electronic document, title of an electronic document (e.g., document title, email subject), and so forth. The metadata criteria used for filtering may be different for different types of electronic documents. For example, for emails, the metadata filter criteria may include the sender of the email, the recipients of the email (including "CC" and "BCC" recipients, if applicable), the date when the email was sent, the subject line of the email, email attachment information, email thread information, and so forth. A user may configure rules using Boolean combinations (or other combinations) of metadata values. For example, a user may specify a rule that states that documents from a particular sender sent between certain dates are to be selected for subsequent processing. Applying such metadata rules, only those electronic documents from the input collection of electronic documents that match at least one of the meta-data rules (or all or other combinations) are to be selected for subsequent processing.

Other filtering techniques may also be used in 302. Combinations of different filters may also be used. For example, a combination of keyword matching and metadata matching may be used. For example, filter rules may be specified that provide Boolean combinations of keyword rules and metadata rules. Only those documents that match at least one (or all) of these rules are then selected for subsequent organizational processing. As indicated above, according to an embodiment of the present invention, the summary representations of the documents may be used for the filtering.

The electronic documents that are selected from the filtering performed in 302 are then organized into folders (or groups, in general) and hierarchical relationships are established between the folders (step 304). The electronic documents are grouped in folders such that a folder comprises electronic documents discussing a common topic or concept. Each folder thus represents a concept (or multiple concepts) and comprises documents whose contents are related to the concept (or concepts). Accordingly, as part of 304, one or more concepts are determined for each document and the document assigned to a folder based upon the one or more concepts. The summary representation generated for each document may be used to determine the concepts for a document. A new folder may be created for each new concept that is determined. The folders are then organized hierarchically based on their conceptual interrelationships so that closely related folders (i.e., folders representing closely related concepts) share a common parent folder. Information related to the hierarchical collection of folders may then be output to the user.

According to an embodiment of the present invention, within each folder, the documents grouped in that folder may be organized in a logical conceptual manner. For example, within a folder, the documents may be sequentially organized such that related documents (e.g., exact duplicate, near duplicates, documents in a chain, in general documents that have a certain degree of similarity to each other) occur next to each other. This ordering of documents within a folder further facilitates review of the documents by the user as the user can easily go down the list of documents in a folder and review related documents sequentially.

A variety of different techniques may be used for organizing the electronic documents into a hierarchical collection of folders. According to an embodiment of the present invention, the electronic documents are organized using clustering techniques. One such clustering technique uses a notion of document similarity to perform the clustering.

Document similarity is a statistical measure of the distance between two documents. As previously indicated, a vector (or other summary representation) may be generated for each electronic document representing a summary of the contents of the electronic document including a summary of word occurrences in the electronic document. Each word in this high-dimensional space of words for the electronic documents may be assigned an importance that is directly proportional to the word's frequency in the set of electronic documents that are selected for organization and inversely proportional to the fraction of documents in which it occurs. The summary representations for the documents may then be used to determine the degree or level of similarity (or similarity metric) between the documents. Various techniques may be used to determine the similarity metrics including techniques known to those skilled in the art. According to an embodiment of the present invention, two electronic documents may be considered "close" or related when the document degree of similarity (or the similarity metric) between the documents is within some acceptable user-configurable threshold or limit. For example, in one embodiment, documents may be considered "close" when the distributions of words in the two documents are similar, with the proviso that the similarities in the distribution of more important words have a higher weight. This notion of document similarity identifies documents discussing the related subject matter and common concepts. For example, for the subject or concept of sales forecasts, two documents about sales forecasts would be deemed "close" to each other if there were a large overlap in the distribution of words in the documents. This is possible even if one document talks about "sales forecasts" while the other talks about "revenue projections" because the distribution of enough other words, such as "deals" and "pipeline", are similar. However, a document about "sales" on winter gear due to snow being "forecast" may not be deemed "close" to the sales forecast documents because the overall word distributions are very different.

An example of a clustering technique that may be used for organizing the documents into a hierarchical collection of folders is described in U.S. patent application Ser. No. 09/860,646 entitled "Method & System for Classifying or Clustering One Item into Multiple Categories" filed May 18, 2001, the entire contents of which are incorporated herein by reference for all purposes.

Figure 4:
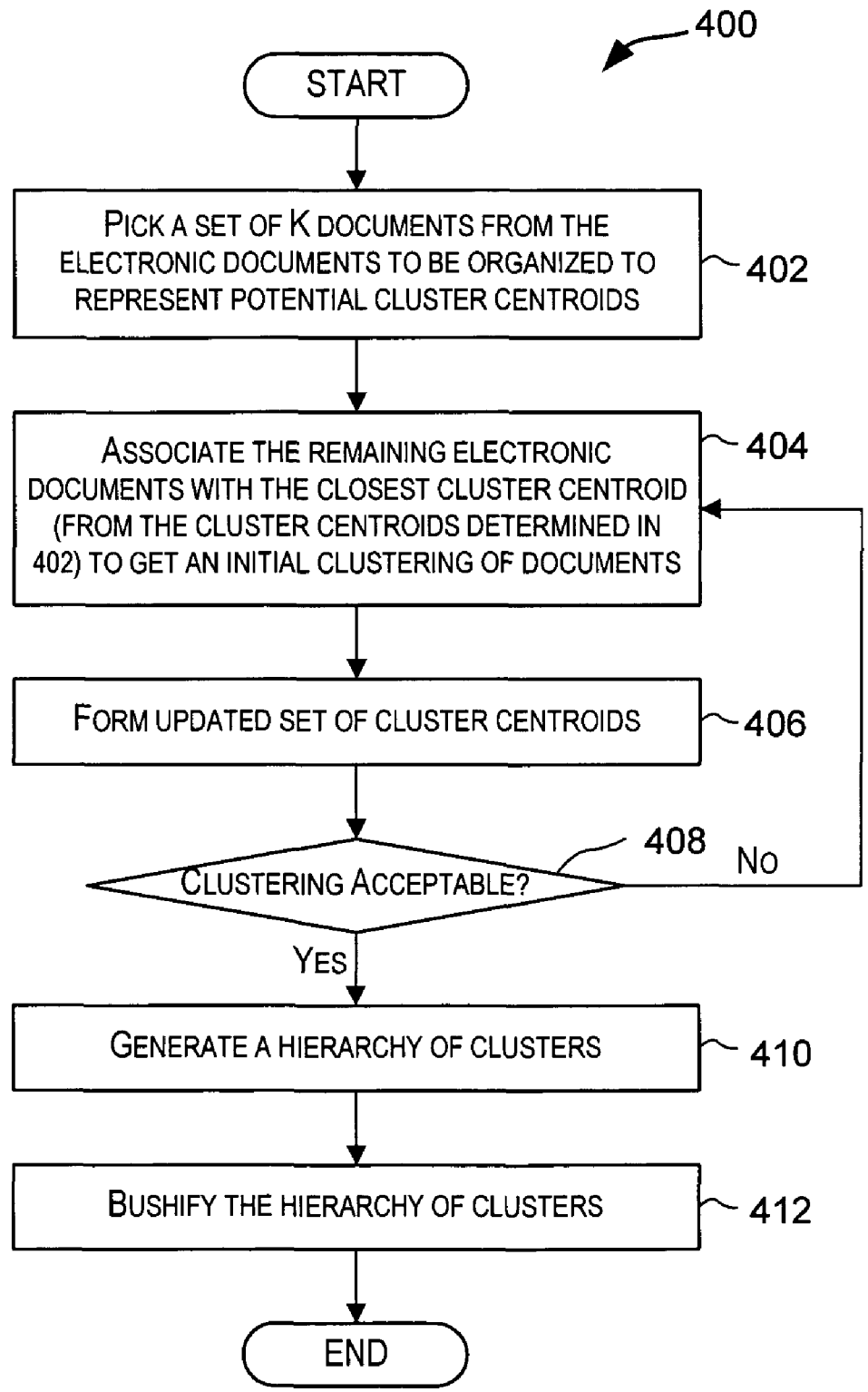
FIG. 4 depicts a simplified high-level flowchart depicting a method for performing clustering according to an embodiment of the present invention.

FIG. 4 depicts a simplified high-level flowchart 400 depicting a method for performing clustering according to an embodiment of the present invention. The flowchart depicted in FIG. 4 uses a hierarchical agglomerative clustering technique to organize the electronic documents. A K-means algorithm is used to get an initial, non-hierarchical set of clusters, and then hierarchical agglomerative clustering (HAC) is used to organize the resulting clusters into a hierarchical structure. The method depicted in FIG. 4 may be performed by software code modules or instructions executed by a processor, hardware modules, or combinations thereof. Flowchart 400 depicted in FIG. 4 is merely illustrative of an embodiment of the present invention and is not intended to limit the scope of the present invention. Other variations, modifications, and alternatives are also within the scope of the present invention.

As depicted in FIG. 4, the K-means clustering technique starts by picking a set of K documents from the electronic documents to be organized to represent potential cluster centroids (step 402). The remaining electronic documents are then associated with the closest cluster centroids (determined in 402) to get an initial clustering of documents (step 404). As part of the clustering process, the summary representations of the documents may be compared to determine a similarity metric between the documents. The similarity metric may be used to determine the clustering. The process of placing documents in the various clusters naturally moves the cluster centroids to a new point, resulting in a new updated set of cluster centroids (step 406). Steps 404 and 406 of placing documents are then repeated with the new cluster centroids until an acceptable clustering is generated (determined in step 408). The determination of what is acceptable may be configured by a user of the present invention. Acceptability may be based on various different parameters such as the number of documents per cluster, the number of clusters, the level or degree of similarity between documents within a cluster, and the like.

A user may set values for these parameters which are then used to determine if an acceptable clustering has been achieved.

Each resulting cluster represents a group (or folder) of documents discussing a common concept or concepts. Using this technique, documents within a cluster (or folder) represent documents that are all sufficiently close to the centroid of the cluster based upon a similarity metric (or measure) determined by comparing the summary representations of the documents. A document could belong to more than one cluster if the similarity metric dictates that the document is sufficiently close to multiple cluster centroids. This typically happens when the contents of a document are relevant to more than one concept or topic. Accordingly, a document may be grouped into multiple clusters or folders.

Once an acceptable set of initial clusters (folders) has been identified in 408, the non-hierarchical clusters are then organized into a hierarchy. A HAC technique may be used to repeatedly co-relate the two closest clusters to generate a hierarchy of clusters (step 410). According to an embodiment of the present invention, a binary tree of clusters is generated with each cluster having at most two child clusters (or sub-clusters). Accordingly, in this embodiment, the processing performed in 410 combines the two closest clusters under a common parent to generate a binary tree of clusters, i.e., each cluster has at most two sub-clusters.

According to an embodiment of the present invention, in order to make the hierarchical structure of clusters or folders more natural for review and analysis, the hierarchical structure generated in 410 (e.g., the binary tree) is made "bushier" by reducing the number of hierarchical levels (step 412). According to an embodiment of the present invention, this is done by absorbing a cluster (or folder) into its parent folder if its sub-clusters match the parent's other sub-clusters sufficiently well. As a result of processing performed in 412, a folder or cluster may have more than two sub-clusters or sub-folders. The result of 412 is a hierarchically organized set of folders.

Information related to the hierarchical collection of folders generated in 412 may then be output to the user. It should be apparent that the present invention is not limited to the clustering techniques described above. Several other techniques (including other clustering techniques and other techniques) may also be used.

As described above, the summary representation (e.g., vector of words) generated for the electronic documents during the parsing (e.g., step 204 in FIG. 2) may be used for filtering the electronic documents to determine a subset of electronic documents to be organized and also for determining similarity distances between the electronic documents during the clustering process. Accordingly, according to an embodiment of the present invention, an electronic document is parsed only once and the results obtained from the parsing used for both the filtering and clustering processing steps. Since document parsing is generally a computationally expensive processing step, performing the parsing once to generate a summary representation and using the parsing results (e.g., the summary representation) for the filtering and clustering provides significant time and resource benefits.

According to the clustering technique described above, each folder in the resultant hierarchical collection of folders comprises documents related to a similar subject or concept. In one embodiment, each cluster comprises documents having similarity metrics within a user-configurable threshold of each other. Each folder thus facilitates rapid review of a collection of related documents. Furthermore, given a particular electronic document, other related documents may be easily found as they are grouped within the same folder as the particular electronic document.

Further, documents within a folder may also be sequentially organized in a logical conceptual manner. For example, within a folder, the documents may be sequentially organized such that related documents (e.g., exact duplicate, near duplicates, documents in a chain, etc.) occur next to each other. This ordering of documents within a folder further facilitates review of the documents by the user as the user can easily go down the list of documents in a folder and review related documents sequentially.

According to an embodiment of the present invention, each folder in the hierarchical collection of folders is named based upon the concept represented by the folder. In this manner, the name of a folder provides a clear indication of the main topic of discussion of electronic documents grouped in the folder. In one embodiment, a combination of important words and phrases occurring in the electronic documents grouped in a folder may be used to determine a name for the folder. In this manner, the name of the folder conveys information regarding the contents of the documents grouped in the folder. The name used for a folder may be such that it distinguishes the folder from other folders in the hierarchical collection of folders including from parent and sibling folders.

The hierarchical collection of folders and the naming strategy used for the folders facilitates rapid review of the electronic documents by a user since the user can easily determine the list of subjects or topics determined for the documents from the folder names. A user may also review documents related to a particular topic by opening the folder representing that topic and named accordingly. The user's review of documents within a folder is further enhanced by the manner in which documents are sequentially organized within a folder.

The hierarchical collection of folders also enables the user to perform various actions on groups of related documents. For example, the concept-wise organization supports rapid prioritization, since documents about important concepts/subjects can be easily identified and reviewed first. The concept-based organization also helps to automatically identify "junk" documents such as "junk mail" as such documents are sorted into a separate folder. Folders representing junk mail can be triaged as being low priority, or can be simply ignored. Given the proliferation of junk mail, this yields substantial savings in document review.

The folders also provide an effective mechanism for document assignment by assigning reviewers to documents in a folder hierarchy. For example, based upon a folder name, a particular concept to which the documents in the folder relate to may be easily determined and the folder (including the documents grouped to that folder) representing that concept may be assigned for review to a reviewer having an expertise in the particular concept. This assignment mechanism significantly speeds up review, since it is much easier to review a collection of related documents about the same subject.

The concept-based hierarchical collection of folders also enables closely related documents to be tagged consistently. Documents in different languages may be organized into separate folder hierarchies to facilitate review. This enables reviewers with appropriate language skills to review each folder.

According to an embodiment of the present invention, electronic documents may be placed in multiple folders, as appropriate, so that documents about multiple topics are placed in folders corresponding to each topic. This eliminates the worry of "misfiled" documents, and provides the ability to find the same document from multiple perspectives. In particular, in looking for a document related to multiple concepts and filed into multiple folders, one can choose the appropriate perspective (i.e., the appropriate concept folder) from which the document is to be viewed.

By creating hierarchical relationships between folders, folders representing closely related topics are organized under a common parent folder. This hierarchical organization supports easy browsing and navigation (e.g., drill down) to find documents of interest for a concept at various levels of generalization.

According to an embodiment of the present invention, as part of hierarchical collection of folders generation, duplicate documents and near duplicate documents in the document corpus are identified and appropriately tagged. The determination of duplicate or near duplicate documents is generally based upon the contents of the documents being compared. Such duplicates or near duplicates are also sometime referred to as content duplicates or content near duplicates. In other embodiments, the determination of duplicates and near duplicates may be based upon metadata associated with the documents. In yet other embodiments, the determination of duplicates and near duplicates may be based both on the contents of the documents and the metadata associated with the documents. For purposes of describing duplicates and near duplicates, it is assumed in this application that the determination is based upon the contents of the documents. However, this is not intended to limit the scope of the present invention.

Various different techniques may be used to determine duplicates. According to one technique, the summary representations generated for the documents are used. For example, in one embodiment, a hash (e.g., an MD5 hash) may be computed for each document based upon the contents of the electronic document. The hash may be determined when the document is parsed. The hash values may then be used to determine duplicates, for example, electronic documents that have the same hash represent exact duplicate documents. Identifying exact duplicates is beneficial during review since only one copy of a collection of exact duplicates needs to be reviewed.

Embodiments of the present invention are also capable of extending the identification of exact duplicates to include the identification of near duplicates. Near duplicates are documents where the differences between the contents of the documents, are less than some user-configurable threshold. Near duplicates documents are documents where, based upon a comparison of the documents (or comparison of the summary representations of the documents) the similarity metrics between the documents is within a user-configurable threshold. Near duplicate documents include duplicate documents. As previously described, document similarity may be measured as a statistical measure of the distance between two documents. According to an embodiment of the present invention, the summary representations (e.g., vectors) generated for the documents may be used to determine the similarity metrics between the documents.

A set of near duplicate documents may include documents that are almost the same, but have minor differences. For example, an email and a reply to that email (including the original email) with a short response may represent near duplicates. As another example, different versions of a document (e.g., different versions of a report) with minor editorial corrections between the versions may be identified as near duplicates. The identification and presentation of a collection of near duplicates enables the rapid review of a collection of very closely related documents. Near duplicates may be identified using similarity metrics as described above.

Figure 5:
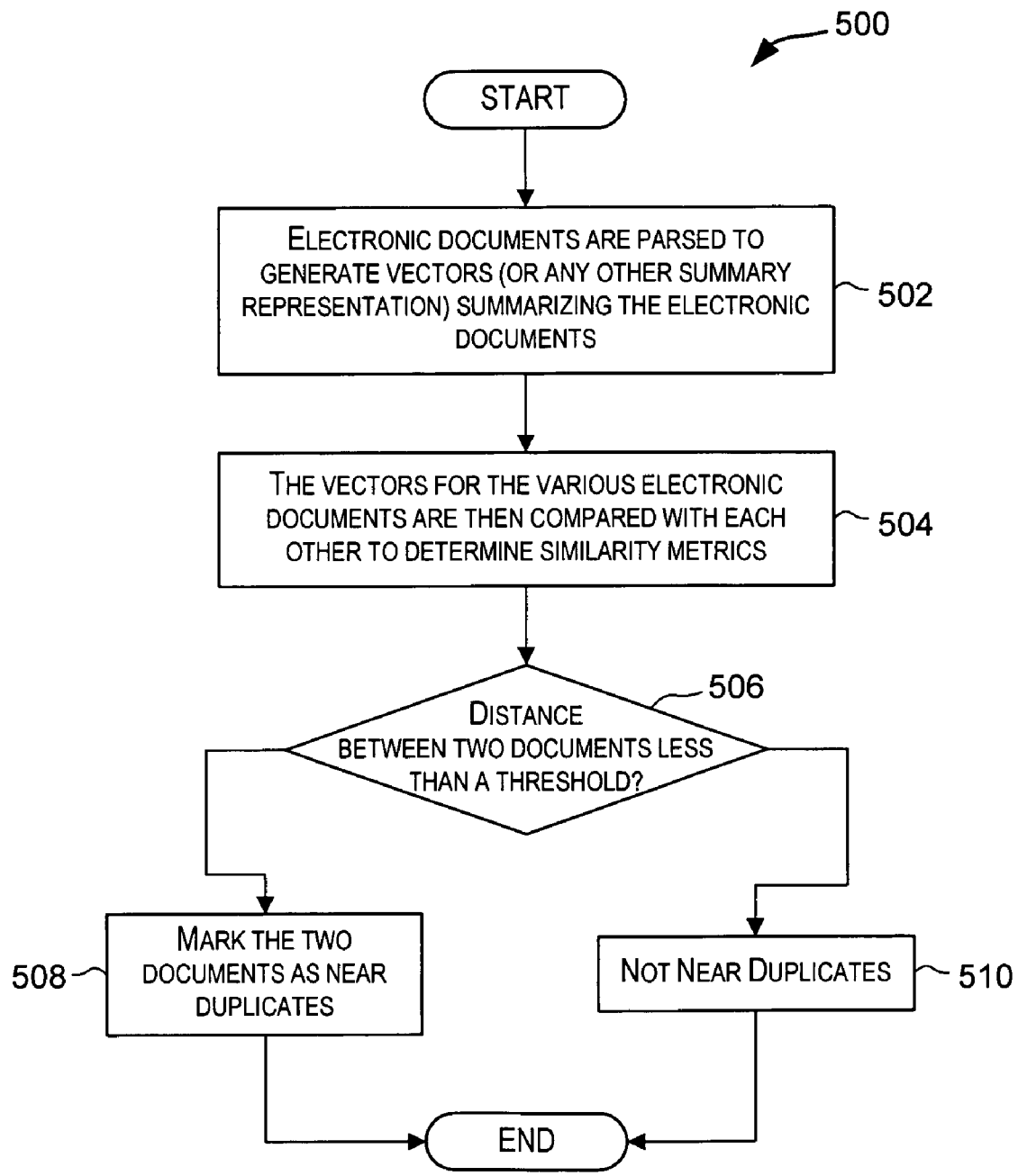
FIG. 5 depicts a simplified high-level flowchart depicting a method of determining near duplicate documents according to an embodiment of the present invention.

FIG. 5 depicts a simplified high-level flowchart 500 describing a method of determining near duplicate documents according to an embodiment of the present invention. The method depicted in FIG. 5 may be performed by software code modules or instructions executed by a processor, hardware modules, or combinations thereof. Flowchart 500 depicted in FIG. 5 is merely illustrative of an embodiment of the present invention and is not intended to limit the scope of the present invention. Other variations, modifications, and alternatives are also within the scope of the present invention.

As depicted in FIG. 5, the electronic documents are parsed to generate vectors (or any other summary representation) summarizing the electronic documents (step 502). The vectors for the various electronic documents are then compared with each other to determine similarity metrics (or distance metrics) between the documents (step 504). In one embodiment, determination of a similarity metric may weight words in a document according to their information content/importance. (step 504). For each pair of electronic documents, a determination is made, based upon the comparison performed in 504, if the distance or difference between two documents is less (or within) than some suitably defined threshold (or level of similarity between documents as measured by the similarity metric is greater than some threshold) (step 506). Accordingly, in 506, a determination is made if the similarity between the two documents based upon comparison of the vectors for the documents is sufficient to deem them as near duplicates. The threshold may be configurable. If the distance between the two documents is determined to be within the threshold (i.e., the similarity between the documents is sufficient), then the pair of electronic documents may be marked as near duplicates (step 508), else the pair of documents may be marked as not near duplicates (step 510). Information identifying near duplicates may be displayed to the user.

The processing depicted in step 502 may be performed as part of step 204 depicted in FIG. 2. The processing depicted in steps 504, 506, 508, and 510 may be performed as part of step 206 depicted in FIG. 2.

The identification of near duplicates may be used in various different ways. For example, in one embodiment, the identification of near duplicates may be used to identify threads of emails. In this case, the near duplicates identified by the above process are further checked to see if one of the documents is an extension of the other, i.e., created by adding more information in the front of the document. Using other available metadata (e.g., sender, receiver, date, etc.), a determination may then be made if an email was created by forwarding or replying to an earlier email. In this manner, email threads may be determined and displayed to the user. The email threads could be identified in other ways, such as looking for the inclusion of one message within the other message, or identifying the MessageID, which is the unique identifier of the original email, etc.

As described above, electronic documents are organized into folders without any preconceived notion of what the organization should be, i.e., the organization of the folders is automatically created from the documents themselves. Then concepts to which the documents are related to are also not known a priori but are determined as part of the generating the hierarchical collection of folders.

According to an embodiment of the present invention, the concept-based hierarchical collection of folders may also be created based upon a set of input keywords. For example, in a law firm, a lawyer familiar with a case may provide a set of keywords and phrases that are important for the case. The concept-based hierarchical folder organization takes these keywords and phrases as input and creates folders of documents based upon the input keywords and phrases. This gives the client law firm a powerful, yet simple, way of controlling the hierarchical folder organization.

Figure 6:
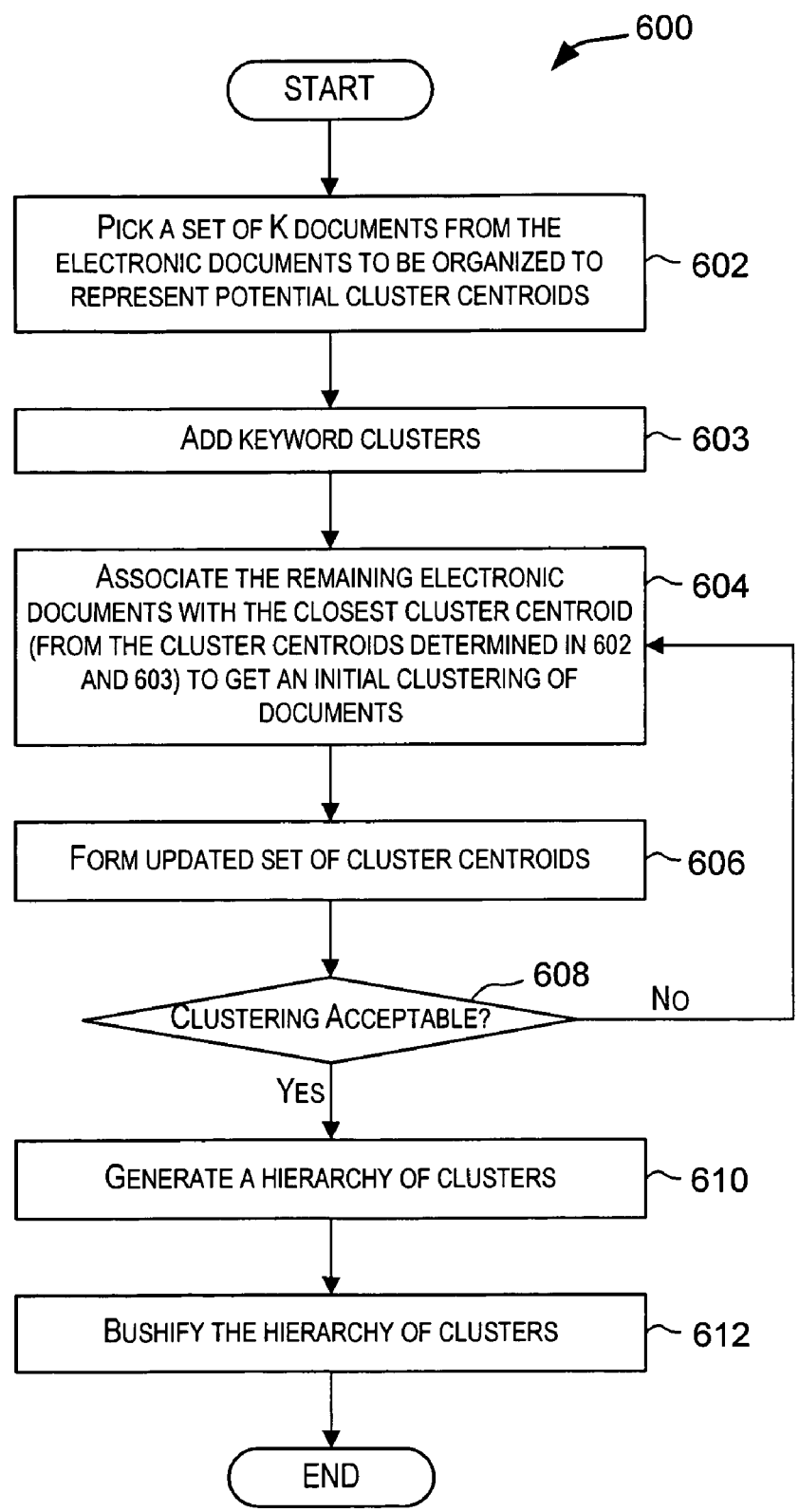
FIG. 6 depicts a simplified high-level flowchart for performing clustering around keywords and phrases according to an embodiment of the present invention.

Several different techniques may be used for clustering around keywords and phrases. FIG. 6 depicts a simplified high-level flowchart 600 for performing clustering around keywords and phrases according to an embodiment of the present invention. The method depicted in FIG. 6 may be performed by software code modules or instructions executed by a processor, hardware modules, or combinations thereof. Flowchart 600 depicted in FIG. 6 is merely illustrative of an embodiment of the present invention and is not intended to limit the scope of the present invention. Other variations, modifications, and alternatives are also within the scope of the present invention.

The processing depicted in FIG. 6 is quite similar to the processing depicted in FIG. 4. In the processing depicted in FIG. 6, a K-means algorithm is used to select an initial set of K documents as initial cluster centroids (step 602 which is similar to step 402 in FIG. 4). The K-means algorithm is modified by adding to this initial set of clusters a set of additional clusters representing the input keywords and phrases, one cluster per keyword or phrase (step 603). The centroid of these clusters, represented as a vector in the high-dimensional vector space of words and phrases, is a unit vector in the direction of the word or phrase under consideration. Furthermore, the bias provided by these "keyword clusters" may be controlled by associating a weight with the cluster representing the number of documents already assumed to be in the cluster (this is analogous to setting Bayesian priors in statistical estimation).

As an example, assume that a user is interested in "sales forecast" as a key phrase. Documents containing the phrase "sales forecast" would then tend to fall into the corresponding cluster. But once documents are added to the cluster, additional keywords and phrases get added to the cluster's centroid, e.g., "revenue projection", "margins", etc. Hence, in subsequent steps documents containing "revenue projection" and "margins" will also fall into the "sales forecast" cluster, even though these documents don't contain the phrase "sales forecast". The extent to which this happens depends on the initial strength (Bayesian prior) associated with the cluster.

The processing performed in steps 604, 606, 608, and 610 is similar to the processing performed in steps 404, 406, 408, and 410 in FIG. 4 and described above.

According to an embodiment of the present invention, the concept-based hierarchical collection of folders may also be created based upon a set of rules. The rules may be user-configurable and may specify one or more conditions. The conditions may relate to the contents of a document, document metadata, or other document characteristics or features. In one embodiment, each rule may be a Boolean expression comprising one or more conditions joined by Boolean connectors (e.g., OR, AND, etc.). The rules may identify conditions that are to be used to define an initial set of clusters for the clustering process. For example, one or more rules may be defined based upon keywords or phrases. For example, a rule R1 may be defined as "'keyword_1' AND 'keyword_2'". As part of the clustering process, an initial cluster is created for documents that satisfy rule R1 (i.e., contain keywords keyword_1 and keyword_2). Several such rules may be defined to guide the clustering process. The processing for rules-based clustering is similar to keyword-based clustering depicted in FIG. 6 and described above. Instead of keyword-based clusters, rule-based clusters are used to guide the clustering process. A combination of different clustering techniques may also be used by embodiments of the present invention.

In the embodiments described above, a hierarchical collection of folders is created for a collection of electronic documents to be reviewed and analyzed. However, in practice, not all documents for review are available at the same time for processing. It is more common for some documents to be initially available and then additional documents to become available over time (e.g., more documents become available as a legal case progresses). Also, in situations where the initial collection of documents available for processing is large, rather than organize the documents all at once using the techniques described above, a user may want to process the document corpus in smaller batches so that review and analysis of the documents may start as soon as possible. With each additional batch of documents, the user may want to organize the documents using a hierarchical collection of folders generated for a previously processed batch of documents.

According to an embodiment of the present invention, techniques are provided that enable generation of a hierarchical collection of folders based upon a previously available folder organization. The automatic generation of the hierarchical collection of folders is biased or guided with an input folder organization. The input folder organization may have been generated based upon an initial set of documents using the techniques described above (e.g., using clustering, using keyword based clustering, etc.). Alternatively, the input folder organization may have been created using some other technique. In the resultant hierarchical collection of folders, the additional electronic documents are placed in folders of the input folder organization as appropriate and new folders are created to store documents that contain content related to new concepts that are not represented by folders in the input folder organization. Accordingly, the resultant hierarchical collection of folders comprises the input folder organization with possibly new folders being added to contain documents that could not be placed in folders from the input folder organization. In this manner, an initial input folder organization, possibly created based upon an initial collection of documents, is refined and extended as appropriate with each new collection of documents.

Various techniques may be used to build a hierarchical collection of folders based upon an input folder organization. One such technique is described in U.S. application Ser. No. 10/017,504 filed Dec. 14, 2001 entitled "Method and System for Guided Cluster Based Processing on Prototypes", the entire contents of which are incorporated herein by reference for all purposes. The technique described in U.S. application Ser. No. 10/017,504 may be augmented in response to specific needs of the application of the hierarchical collection of folders (e.g., for a legal application). The resultant hierarchical collection of folders comprises both the folders and documents in the initial organization with possibly new folders. Since users may have already become familiar with the initial folder organization, the guided clustering technique according to an embodiment of the present invention maintains the relative locations (or hierarchical relationships) of the folders in the input folder organization, (i.e., if one folder was the ancestor of another folder, then it continues to be an ancestor of that folder in the new organization) and the locations of the original documents within the folders are not modified. It should be apparent that several other techniques may also be used to perform the guided generation of a hierarchical collection of folders.

Embodiments of the present invention also enhance full-text and meta-data searching by combining the results of the search with the concept-based folder organization techniques discussed above. In this manner, embodiments of the present invention are able to integrate traditional searches with the concept-based folder organization. This may be performed using several different techniques. According to an embodiment of the present invention, the results of a search are organized and presented to users according to the folder structure, i.e., documents in the search results are "bucketed" into the concept folders and users are presented with the list of resulting folders. A separate folder may also be displayed representing all the search results. Each resulting folder in the hierarchical collection of folders represents just those search results that belong to the folder. Given the ambiguity of search terms, a concept-based organization of search results effectively separates results matching different senses of the search terms, thus allowing users to focus on just the appropriate folders and rapidly find documents of interest. A user can navigate from the search buckets to the concept folders, thus providing easy access to closely related documents that don't necessarily match the search query. The organization of the results may be combined with other metadata that is available, such as senders and receivers of email, so that the user can easily see the distribution of search results across different folders and different metadata.

In addition to the contents of electronic documents, a variety of metadata may also be used to drive the filtering of electronic documents (as described above) and also the generation of the concept-based hierarchical collection of folders. An initial hierarchical structure of folders may be used to drive further refinement of the organization based upon metadata such as senders and receivers of email as opposed to just keywords in the documents. This enables a user to help the system automatically set up an organization that is close to the way the user would like to organize the documents. For example, the user can specify an initial organization for the documents based on a few keywords or documents or metadata, and an embodiment of the present invention can extend the organization based on the remaining documents in the set. This allows the user to create a view of the documents that corresponds to how the user sees the universe or would like to see the universe of documents. One practical application of such an organization is that it enables the user to more easily split or assign the review of documents (or other work related to the documents) effectively among experts in the different areas.

As described above, the hierarchical collection of folders generated by embodiments of the present invention provides a concept-based organization of electronic documents, together with the identification of exact and near duplicate documents in a manner that supports rapid review of the collection of electronic documents. Rapid review is enabled by the feature that closely related documents (namely, exact duplicate documents, near duplicate documents, documents about the same concept, or in general documents that possess a certain degree of similarity) are grouped together and thus can be reviewed together. According to an embodiment of the present invention, a document numbering technique is used for generating and associating numbers with the electronic documents based upon the concept-based hierarchical collection of folders. The document numbering technique provides one way of organizing any collection of documents such that closely related documents are numbered next to each other when the collection of documents is sorted based upon numbers calculated and associated with the documents. Using this numbering technique, closely related documents in the collection show up consecutively, thus enabling rapid review.

According to an embodiment of the present invention, each document in the collection is assigned a document number according to the following rules:

(1) The basic ordering and numbering of documents follows a depth-first pre-order traversal of the concept-based hierarchical collection of folders. If a document is placed in more than one concept folder, the document is associated with its best concept (denoted as its primary concept). This implies that if documents d1 and d2 have primary concepts t1 and t2, respectively, and t1 appears above t2 (i.e., t2 is an ancestor of t1 in the hierarchy, or t1 and t2 are siblings but t1 appears lexicographically before t2, etc.), when the whole hierarchical collection of folders is opened up, then d1's document number is less than d2's document number.

(2) If documents have the same primary concept, then the following rules apply:

(a) Exact duplicates are assigned consecutive document numbers. Exact duplicates are ordered so that more recent documents have lower document numbers.

(b) Different sets of exact duplicates, all of which are near duplicates of each other, are also assigned consecutive document numbers. Two sets of exact duplicates that are near duplicates of each other are ordered so that the exact duplicates with the most recent document have lower document numbers. Since exact and near duplicates occur together, an "effective timestamp" of a document in the set of duplicates and near duplicates is set to be the timestamp of the most recent document in the set. The effective timestamp of a document with no content or near duplicates is simply the document's timestamp.

(c) For documents that are not exact or near duplicates of each other, documents with more recent effective timestamps have lower document numbers.

For example, consider documents d1, d2, d3, d4, d5, with timestamps p1, p2, p3, p4, p5, respectively, and p5>p4>p3>p2>p1 (i.e., d5 is the most recent document, followed by d4, and so forth). Suppose d1 and d2 are exact duplicates, d3 and d4 are exact duplicates, d3 and d4 are near duplicates of d1 (and d2), and d5 is unrelated to the rest of the documents. By (a) above, d2 is assigned a lower document number than d1 (since d2 is more recent than d1) and d4 is assigned a lower document number than d3. By (b) above, d3 and d4 are assigned lower document number than d1 and d2. Furthermore, since d4 is the most recent document in this collection of near and content duplicates, the effective timestamp of documents d1, d2, d3, and d4 is p4. Since d5 is unrelated to any of the other documents, its effective timestamp is p5. Finally, by (c) above, since p5>p4, it follows that the following is the ordering of documents by increasing document number: d5, d4, d3, d2, d1.

Given a collection of electronic documents having document numbers generated according to the above described document numbering technique, sorting the documents by document number has the effect that related documents show up close to each other in the sorted list of documents. Exact duplicate documents show up consecutively in the sorted list. Sets of exact duplicates that are near duplicates of each other will show up consecutively. Collections of documents with the same primary concept show up consecutively in the list. In this manner, closely related documents in the collection show up consecutively, thus enabling rapid review.

There are several ways in which document numbering may be used to facilitate review of a collection of documents. In one embodiment, the entire collection of documents (which may organized in a hierarchical collection of folders) may be sorted based upon numbers assigned to the documents to generate a sorted flat list of documents where related documents (e.g., duplicates, near duplicates, etc.) occur close to each other. The entire collection of documents is thus automatically ordered to facilitate review. A user may then go down the list and review the documents.

Document numbering may also be used to organize documents within a folder. As described above, documents are grouped in folders based upon the concepts of the document contents. Several documents may be grouped to a particular folder. Within the particular folder, the documents may be sorted based upon document numbers assigned to the documents. By doing this, the documents in the folder are organized such that related documents show up consecutively. This provides a further level of organization within a folder that facilitates review of the documents. Accordingly, the documents are not only organized into folders but within each folder the documents are organized in a manner that facilitates rapid review and analysis of the documents.

Figure 7:
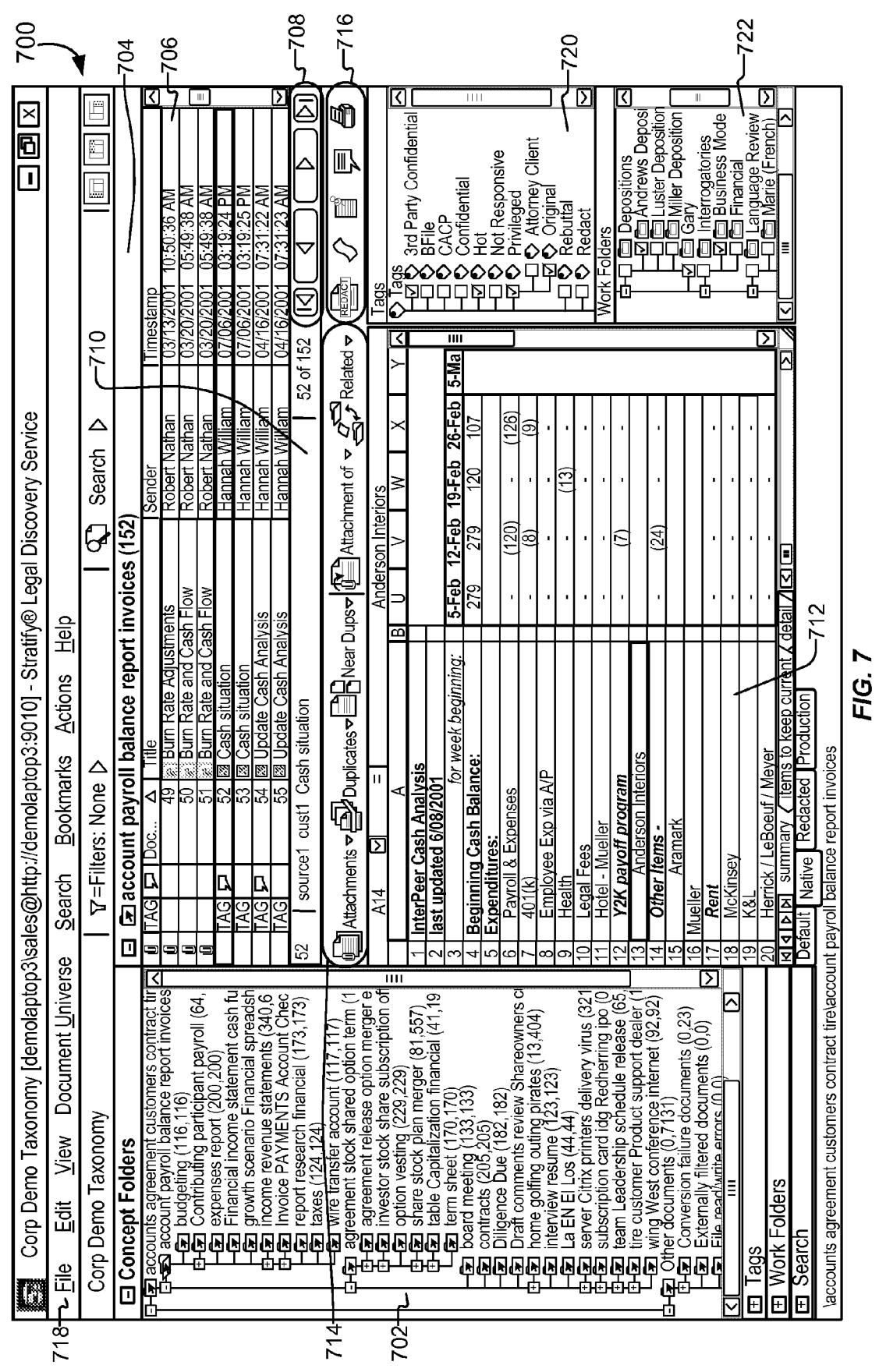

Information regarding the hierarchical collection of folders may be output to a user using several different techniques. FIG. 7 depicts a simplified graphical user interface (GUI) 700 according to an embodiment of the present invention. GUI 700 displays information related to the concept based hierarchical collection of folders and other information. GUI 700 depicted in FIG. 7 is merely illustrative of an embodiment of the present invention and is not intended to limit the scope of the present invention. Other variations, modifications, and alternatives are also within the scope of the present invention.

As depicted in FIG. 7, information identifying multiple folders and the hierarchical relationships between the folders is displayed in an area 702 of GUI 700. Each folder may represent a particular concept and contain documents determined to comprise contents relevant to the concept represented by the folder. As described above, according to an embodiment of the present invention, the names of the folders convey information about the concepts (or concepts) represented by the folders. According to an embodiment of the present invention, as depicted in FIG. 7, the name of a folder may be determined based upon the contents of documents (e.g., important words) grouped in the folder. The hierarchical relationships between the folders are also depicted in FIG. 7 in area 702. The hierarchical relationship relates folders representing related concepts.

A user may select a particular folder from area 702 to drill-down into the contents of the folder. The name of the selected folder is displayed in area 704. A list of electronic documents grouped or contained in the selected folder is displayed in area 706 of interface 700. As depicted in FIG. 7, a list of documents is displayed for selected folder "account payroll balance report invoices".

Various types of information may be displayed for each document in the list of documents for the selected folder in area 706. In FIG. 7, the information displayed for each electronic document comprises information indicating if the electronic document has an attachment, information indicating if a tag has been associated with the electronic document, information indicating if the document has been annotated, a document number assigned to the document (calculated using the document numbering technique described above), the title of the document and type (e.g., web page, Excel spreadsheet, etc.) of document, information identifying a sender of the document, and a timestamp associated with the document. Other information may be displayed in alternative embodiments. A set of user-selectable controls 708 is provided for navigating through the list of electronic documents.

A user may select a particular electronic document from the list to see further details related to the document. The name of the selected document is displayed in area 710 and the contents of the selected document are displayed in area 712 of GUI 700. In FIG. 7, the selected document is titled "Cash situation" and is an Excel spreadsheet. According to an embodiment of the present invention, the selected document is displayed in native format in area 712. Several different (225+) native file formats are supported by embodiments of the present invention. Accordingly, conversion of the documents to a common display format such as TIFF is not required for most documents. The native formats are also able to display metadata associated with the selected document.

A set of user-selectable controls 714 is also provided for finding additional information in the context of the selected document. The controls depicted in FIG. 7 include: a control to determine attachments, if any, associated with the selected document displayed in area 710; a control to determine documents that are exact duplicates of the selected document; a control to determine documents that are near duplicates of the selected document; a control to determine if the selected document is an attachment of another document; and a control to determine other related documents (e.g., exact duplicates, near duplicates, or documents within a specified similarity distance from each other or possessing a certain degree of similarity) to the selected document.

A set of user-selectable controls 716 is also provided for performing actions on the selected document. The controls depicted in FIG. 7 include: a control to redact portions of a document, a control to download the selected document for review and analysis; a control to bookmark the document for subsequent one-click access; a control to add annotations to the selected document; and a control to print the selected document. Other controls may be provided in alternative embodiments. Other actions may also be performed using the menus provided by menu bar 718.

The controls depicted in FIG. 7 are in the form of buttons and drop-down menus. Various other types of controls may also be provided. Command line controls may also be provided.

A window 720 is shown displaying multiple tags. A user may use this window to associate tags with a document or folder. For a selected document, a user may select one or more tags to be applied to the selected document from the displayed tags. In this manner, GUI 700 enables easy tagging of documents. Documents may be tagged individually, in groups, or as a message unit (e.g., an email and its attachment form a message unit). The tags may be organized hierarchically and may be user-configurable. Given a tagged set of document, users may access all documents for a given tag. Folders may also be tagged.

Documents may also be assigned to particular users (e.g., reviewers) or organized within work folders. A window 722 is displayed displaying a list of users and work folders. For a selected document, a user may select one or more work folders or users to whom the document is to be assigned. For example, a document may be organized within a work folder for subsequent analysis such as a folder for depositions, trial exhibits, etc. Documents may also be exported to analysis tools or local repositories.

A document or folder of documents may be assigned to one or more users. For example, a folder of documents related to a particular concept may be assigned to a reviewer who is an expert in the concept. In one embodiment, a window may be displayed showing folders corresponding to users or groups of users. A document or a folder (or folders) of documents may be selected and assigned to a folder corresponding to a user (resulting in the selected document or folder being assigned to the user) or to a folder corresponding to a group of users (resulting in the selected document or folder being assigned to the group of users).

Tasks may also be assigned to various users. For a user, a "My Tasks" folder (depicted in FIG. 8) may be provided listing tasks assigned to the user.

The user interface depicted in FIG. 7 is one way in which information may be output to the user. The information may also be output in the form of reports, tables, etc. The information may also be made accessible to users via web pages and other types of pages. One embodiment of the present invention is incorporated in the "Stratify Legal Discovery" product and services provided by Stratify, Inc. of Mountain View, Calif.

Figure 8:
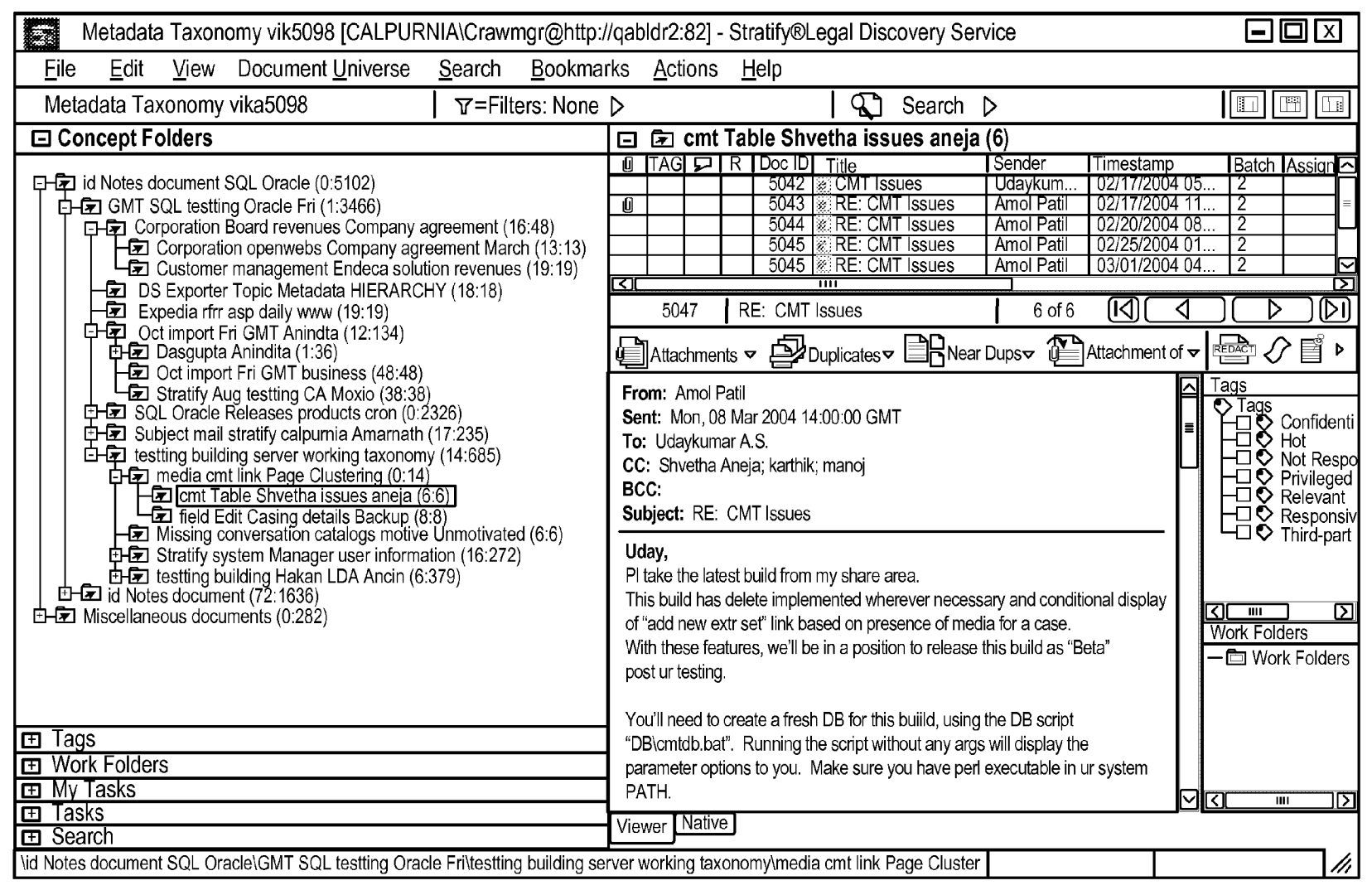

FIG. 8 depicts another simplified graphical user interface (GUI) according to an embodiment of the present invention. In FIG. 8, an email document has been selected for viewing.

Figure 9:
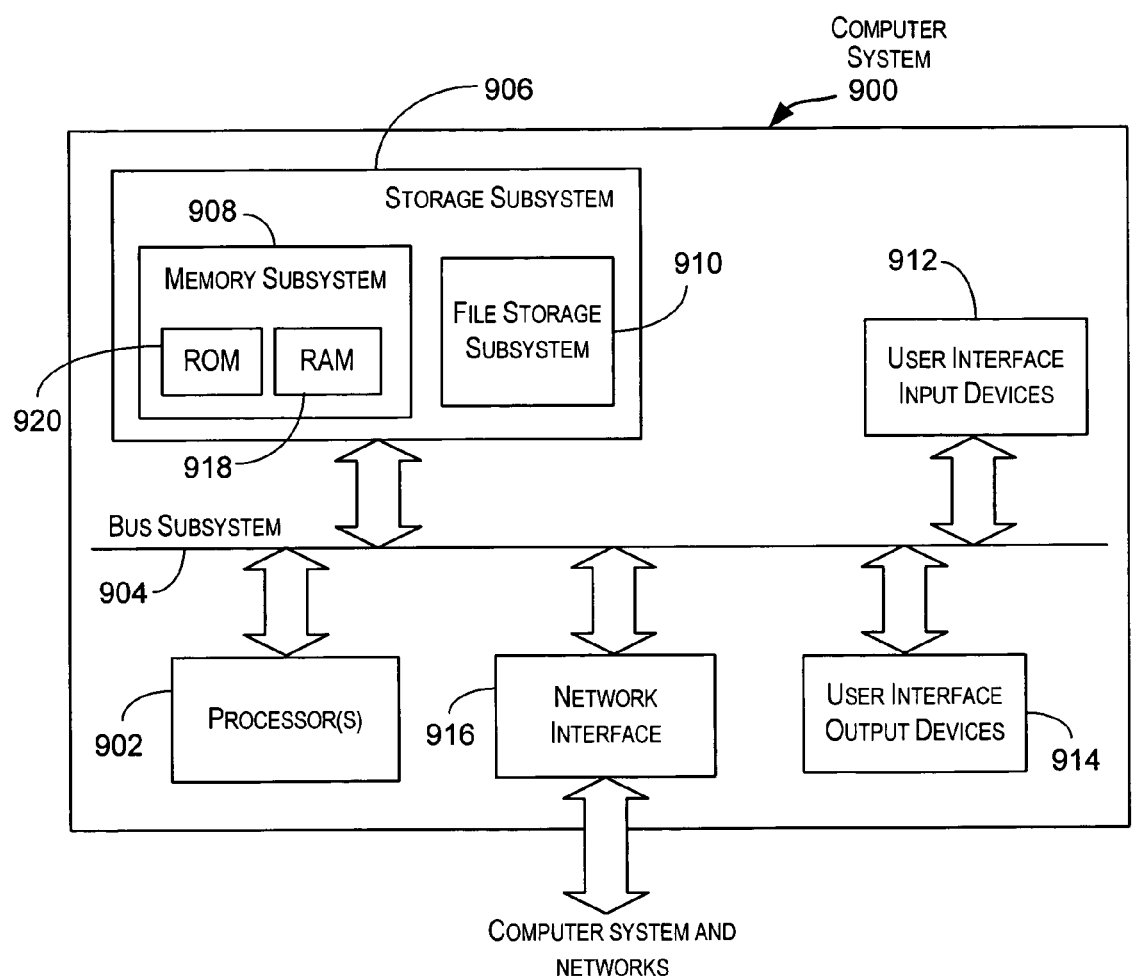
FIG. 9 is a simplified block diagram of a computer system that may be used to practice as embodiment of the present invention.

FIG. 9 is a simplified block diagram of a computer system 900 that may be used to practice as embodiment of the present invention. As shown in FIG. 9, computer system 900 includes a processor 902 that communicates with a number of peripheral devices via a bus subsystem 904. These peripheral devices may include a storage subsystem 906, comprising a memory subsystem 908 and a file storage subsystem 910, user interface input devices 912, user interface output devices 914, and a network interface subsystem 916.

Bus subsystem 904 provides a mechanism for letting the various components and subsystems of computer system 900 communicate with each other as intended. Although bus subsystem 904 is shown schematically as a single bus, alternative embodiments of the bus subsystem may utilize multiple busses.

Network interface subsystem 916 provides an interface to other computer systems and other networks. Network interface subsystem 916 serves as an interface for receiving data for transmitting data to and from computer system 900. Embodiments of network interface subsystem 916 include an Ethernet card, a modem (telephone, satellite, cable, ISDN, etc.), (asynchronous) digital subscriber line (DSL) units, and the like.

User interface input devices 912 may include a keyboard, pointing devices such as a mouse, trackball, touchpad, or graphics tablet, a scanner, a barcode scanner, a touchscreen incorporated into the display, audio input devices such as voice recognition systems, microphones, and other types of input devices. In general, use of the term "input device" is intended to include all possible types of devices and mechanisms for inputting information to computer system 900.

User interface output devices 914 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 900.

Storage subsystem 906 may be configured to store the basic programming and data constructs that provide the functionality of the present invention. Software code modules or instructions that provide the functionality of the present invention may also be stored in storage subsystem 906. These software modules may be executed by processor(s) 902. Storage subsystem 906 may also provide a repository for storing data used in accordance with the present invention. Storage subsystem 906 may comprise memory subsystem 908 and file/disk storage subsystem 910.

Memory subsystem 908 may include a number of memories including a main random access memory (RAM) 918 for storage of instructions and data during program execution and a read only memory (ROM) 920 in which fixed instructions are stored. File storage subsystem 910 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

Computer system 900 can be of various types including a personal computer, a portable computer, a workstation, a network computer, a mainframe, a kiosk, or any other data processing system. Due to the ever-changing nature of computers and networks, the description of computer system 900 depicted in FIG. 9 is intended only as a specific example for purposes of illustrating the preferred embodiment of the computer system. Many other configurations having more or fewer components than the system depicted in FIG. 9 are possible.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. A method comprising:
   generating, by a computer system, a summary representation for each electronic document in a plurality of electronic documents, the summary representation representing a summary of content of the electronic document;
   filtering, by the computer system, the plurality of electronic documents based upon their summary representations to generate a filtered subset;
   organizing, by the computer system, the electronic documents in the filtered subset into a hierarchical collection of folders, the organizing comprising:
      determining similarity metrics between the electronic documents in the filtered subset based upon their summary representations;
      determining concepts associated with the electronic documents in the filtered subset based upon their summary representations; and
      grouping the electronic documents in the filtered subset into the hierarchical collection of folders based upon the similarity metrics and the concepts; and
   assigning, by the computer system based upon a set of rules pertaining to document similarity, a number to each electronic document in the filtered subset by traversing the hierarchical collection of folders, such that when the electronic documents in the filtered subset are sorted based upon the assigned numbers to generate a sorted list of electronic documents, related electronic documents occur consecutively in the sorted list of electronic documents.

2. The method of claim 1 further comprising:
   displaying a graphical user interface (GUI) to facilitate review of the electronic documents in the filtered subset, the GUI comprising:
      a first region displaying the hierarchical collection of folders;
      a second region displaying a list of electronic documents grouped in a selected folder from the hierarchical collection of folders;
      a third region displaying an electronic document selected from the list of electronic documents.

3. The method of claim 2 further comprising:
   identifying at least one set of near duplicate documents from the filtered subset, where the similarity metric between any two electronic documents in the set of near duplicate documents satisfies a threshold.

4. The method of claim 3 wherein, for any one electronic document from the at least one set of near duplicate documents, the GUI provides a control for displaying information identifying the other electronic documents in the at least one set of near duplicate documents.

5. The method of claim 2 further comprising:
   enabling, using the GUI, association of one or more electronic documents from the filtered subset with one or more tags from a plurality of tags.

6. The method of claim 2 further comprising:
   enabling, using the GUI, assignment of one or more electronic documents from the filtered subset to one or more users from a plurality of users.

7. The method of claim 2 further comprising:
   enabling, using the GUI, an action to be performed on multiple electronic documents from the filtered subset.

8. The method of claim 1 further comprising:
   for at least one folder in the hierarchical collection of folders, organizing electronic documents grouped in the at least one folder into an organized list of electronic documents such that related electronic documents occur next to each other in the organized list.

9. The method of claim 8 wherein organizing the electronic documents grouped in the at least one folder comprises:
   assigning a number to each electronic document grouped in the at least one folder based upon the set of rules pertaining to document similarity, such that when the electronic documents grouped in the at least one folder are sorted based upon the assigned numbers to generate the organized list of electronic documents, related electronic documents occur consecutively in the organized list of electronic documents.

10. The method of claim 1 wherein grouping the electronic documents in the filtered subset comprises:
    generating the hierarchical collection of folders using an existing folder organization comprising a set of folders, the hierarchical collection of folders comprising at least the set of folders, wherein a first document from the filtered subset that is related to a first concept is placed in a folder from the existing folder organization if the existing folder organization comprises a folder representing the first concept, and wherein a new folder is created to store the first document if the existing folder organization does not comprise a folder representing the first concept.

11. The method of claim 10 wherein the existing folder organization is generated based upon a set of keywords or a set of rules.

12. The method of claim 1 wherein the summary representation for each electronic document is a high-dimensional space vector that includes pairs of words and scores, each score representing a number of occurrences of a corresponding word in the electronic document.

13. A system comprising:
a memory configured to store a plurality of electronic documents; and
a processor;
wherein the processor is configured to:
generate a summary representation of each electronic document in the plurality of electronic documents, the summary representation representing a summary of content of the electronic document;
filter the plurality of electronic documents based upon their summary representations to generate a filtered subset;
organize the electronic documents in the filtered subset into a hierarchical collection of folders, the organizing comprising:
determining similarity metrics between the electronic documents in the filtered subset based upon their summary representations;
determining concepts associated with the electronic documents in the filtered subset based upon their summary representations; and
grouping the electronic documents in the filtered subset into the hierarchical collection of folders based upon the similarity metrics and the concepts; and
assign, based upon a set of rules pertaining to document similarity, a number to each electronic document in the filtered subset by traversing the hierarchical collection of folders, such that when the electronic documents in the filtered subset are sorted based upon the assigned numbers to generate a sorted list of electronic documents, related electronic documents occur consecutively in the sorted list of electronic documents.

14. The system of claim 13 further comprising an output device, wherein the processor is configured to:
display a graphical user interface (GUI) on the output device to facilitate review of the electronic documents in the filtered subset, the GUI comprising:
a first region displaying the hierarchical collection of folders;
a second region displaying a list of electronic documents grouped in a selected folder from the hierarchical collection of folders;
a third region displaying a first electronic document selected from the list of electronic documents.

15. The system of claim 14 wherein the processor is configured to:
identify at least one set of near duplicate documents from the filtered subset, where the similarity metric between any two electronic documents in the set of near duplicate documents satisfies a threshold.

16. The system of claim 15 wherein, for any one electronic document from the at least one set of near duplicate documents, the GUI provides a control for displaying information identifying the other electronic documents in the at least one set of near duplicate documents.

17. The system of claim 14 wherein the processor is configured to:
enable, using the GUI, association of one or more electronic documents from the filtered subset with one or more tags from a plurality of tags.

18. The system of claim 14 wherein the processor is configured to:
enable, using the GUI, assignment of one or more electronic documents from the filtered subset to one or more users from a plurality of users.

19. The system of claim 14 wherein the processor is configured to:
enable, using the GUI, an action to be performed on multiple electronic documents from the filtered subset.

20. The system of claim 13 wherein the processor is configured to:
for at least one folder in the hierarchical collection of folders, organize electronic documents grouped in the at least one folder into an organized list of electronic documents such that related electronic documents occur next to each other in the organized list.

21. The system of claim 20 wherein the processor is configured to:
assign a document number to each electronic document grouped in the at least one folder based upon the set of rules pertaining to document similarity, such that when the electronic documents grouped in the at least one folder are sorted based upon the assigned numbers to generate the organized list of electronic documents, related electronic documents occur consecutively in the organized list of electronic documents.

22. The system of claim 13 wherein the processor is configured to:
generate the hierarchical collection of folders using an existing folder organization comprising a set of folders, the hierarchical collection of folders comprising at least the set of folders, wherein a first document from the filtered subset that is related to a first concept is placed in a folder from the existing folder organization if the existing folder organization comprises a folder representing the first concept, and wherein a new folder is created to store the first document if the existing folder organization does not comprise a folder representing the first concept.

23. The system of claim 22 wherein the existing folder organization is generated based upon a set of keywords or a set of rules.

24. A computer-readable medium storing a plurality of instructions for controlling a data processor, the plurality of instructions comprising:
instructions that cause the data processor to generate a summary representation for each electronic document in a plurality of electronic documents, the summary representation representing a summary of content of the electronic document;
instructions that cause the data processor to filter the plurality of electronic documents based upon their summary representations to generate a filtered subset;
instructions that cause the data processor to organize the electronic documents in the filtered subset into a hierarchical collection of folders, the instructions that cause the data processor to organize comprising:
instructions that cause the data processor to determine similarity metrics between the electronic documents in the filtered subset based upon their summary representations;
instructions that cause the data processor to determine concepts associated with the electronic documents in the filtered subset based upon their summary representations; and
instructions that cause the data processor to group the electronic documents in the filtered subset into the hierarchical collection of folders based upon the similarity metrics and the concepts; and instructions that cause the data processor to assign, based upon a set of rules pertaining to document similarity, a number to each electronic document in the filtered subset by traversing the hierarchical collection of folders, such that when the electronic documents in the filtered subset are sorted based upon the assigned numbers to generate a sorted list of electronic documents, related electronic documents occur consecutively in the sorted list of electronic documents.

25. The computer-readable medium of claim 24 wherein the plurality of instructions comprises:

instructions that cause the data processor to generate a graphical user interface (GUI) to facilitate review of the electronic documents in the filtered subset, the GUI comprising:
  a first region displaying the hierarchical collection of folders;
  a second region displaying a list of electronic documents grouped in a selected folder from the hierarchical collection of folders;
  a third region displaying a first electronic document selected from the list of electronic documents.

26. The computer-readable medium of claim 25 wherein the plurality of instructions comprises:

instructions that cause the data processor to identify at least one set of near duplicate documents from the filtered subset, where the similarity metric between any two electronic documents in the set of near duplicate documents satisfies a threshold; and wherein, for any one electronic document from the at least one set of near duplicate documents, the GUI provides a control for displaying information identifying the other electronic documents in the at least one set of near duplicate documents.

27. The computer-readable medium of claim 25 wherein the plurality of instructions comprises:

instructions that cause the data processor to enable association of one or more electronic documents from the filtered subset with one or more tags from a plurality of tags; and instructions that cause the data processor to enable assignment of one or more electronic documents from the filtered subset to one or more users from a plurality of users.

28. The computer-readable medium of claim 25 wherein the plurality of instructions comprises:

instructions that cause the data processor to enable performing an action on multiple electronic documents from the filtered subset.

29. The computer-readable medium of claim 24 wherein the plurality of instructions comprises:

instructions that cause the data processor to, for at least one folder in the hierarchical collection of folders, organize electronic documents grouped in the at least one folder into an organized list of electronic documents such that related electronic documents occur next to each other in the organized list.

30. The computer-readable medium of claim 29 wherein the plurality of instructions comprises:

instructions that cause the data processor to assign a number to each electronic document grouped in the at least one folder based upon the set of rules pertaining to document similarity, such that when the electronic documents grouped in the at least one folder are sorted based upon the assigned numbers to generate the organized list of electronic documents, related electronic documents occur consecutively in the organized list of electronic documents.

31. The computer-readable medium of claim 24 wherein the instructions that cause the data processor to group the electronic documents in the filtered subset comprise instructions that cause the processor to generate the hierarchical collection of folders using an existing folder organization comprising a set of folders, the hierarchical collection of folders comprising at least the set of folders, wherein a first document from the filtered subset that is related to a first concept is placed in a folder from the existing folder organization if the existing folder organization comprises a folder representing the first concept, and wherein a new folder is created to store the first document if the existing folder organization does not comprise a folder representing the first concept.

32. The computer-readable medium of claim 31 wherein the existing folder organization is generated based upon a set of keywords or a set of rules.

* * * * *